(12) United States Patent
Wu et al.

(10) Patent No.: US 11,224,814 B2
(45) Date of Patent: Jan. 18, 2022

(54) PROCESSING METHOD AND APPARATUS FOR VIRTUAL RESOURCE IN GAME SCENE

(71) Applicant: NETEASE (HANGZHOU) NETWORK CO., LTD., Zhejiang (CN)

(72) Inventors: Chuanbei Wu, Zhejiang (CN); Zhirong Du, Zhejiang (CN); Qingxin Zheng, Zhejiang (CN); Jiazhen Chen, Zhejiang (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 0 days.

(21) Appl. No.: 16/756,844

(22) PCT Filed: Dec. 20, 2018

(86) PCT No.: PCT/CN2018/122379
§ 371 (c)(1),
(2) Date: Apr. 17, 2020

(87) PCT Pub. No.: WO2019/148992
PCT Pub. Date: Aug. 8, 2019

(65) Prior Publication Data
US 2020/0368623 A1    Nov. 26, 2020

(30) Foreign Application Priority Data

Jan. 30, 2018 (CN) .......................... 201810092813.6

(51) Int. Cl.
*A63F 13/58* (2014.01)
*A63F 13/537* (2014.01)

(52) U.S. Cl.
CPC ............ *A63F 13/58* (2014.09); *A63F 13/537* (2014.09)

(58) Field of Classification Search
CPC ......... A63F 13/537; A63F 13/52; A63F 13/58
See application file for complete search history.

(56) References Cited

U.S. PATENT DOCUMENTS

2002/0196250 A1* 12/2002 Anderson ............ A63H 33/042
345/420
2007/0211047 A1* 9/2007 Doan .................. A63F 3/00643
345/419

(Continued)

FOREIGN PATENT DOCUMENTS

| CN | 1710585 A | 12/2005 |
|---|---|---|
| CN | 103854191 A | 6/2014 |

(Continued)

*Primary Examiner* — Steve Rowland
(74) *Attorney, Agent, or Firm* — Gang Yu

(57) ABSTRACT

A processing method and apparatus for a virtual resource in a game scene are provided. The method includes: according to a current position of a virtual character in a game scene, determining a region where the virtual character is located, loading a corresponding virtual resource in the game scene according to the range of the region, and updating the state of the virtual resource in the game scene in a unit of the region, thereby effectively reducing the resource consumption and greatly reducing the pressure of data processing.

25 Claims, 7 Drawing Sheets

(56) References Cited

U.S. PATENT DOCUMENTS

| | | | |
|---|---|---|---|
| 2009/0113338 A1* | 4/2009 | Hamilton, II | G06K 9/00671 |
| | | | 715/781 |
| 2009/0287707 A1 | 11/2009 | Lyle et al. | |
| 2012/0295703 A1* | 11/2012 | Reiche | A63F 13/235 |
| | | | 463/31 |
| 2017/0182410 A1 | 6/2017 | Townley et al. | |
| 2019/0197765 A1* | 6/2019 | Molyneaux | G06T 15/06 |
| 2019/0355181 A1* | 11/2019 | Srinivasan | G06F 3/04815 |

FOREIGN PATENT DOCUMENTS

| | | |
|---|---|---|
| CN | 103854218 A | 6/2014 |
| CN | 106445588 A | 2/2017 |
| CN | 108434739 A | 8/2018 |

\* cited by examiner

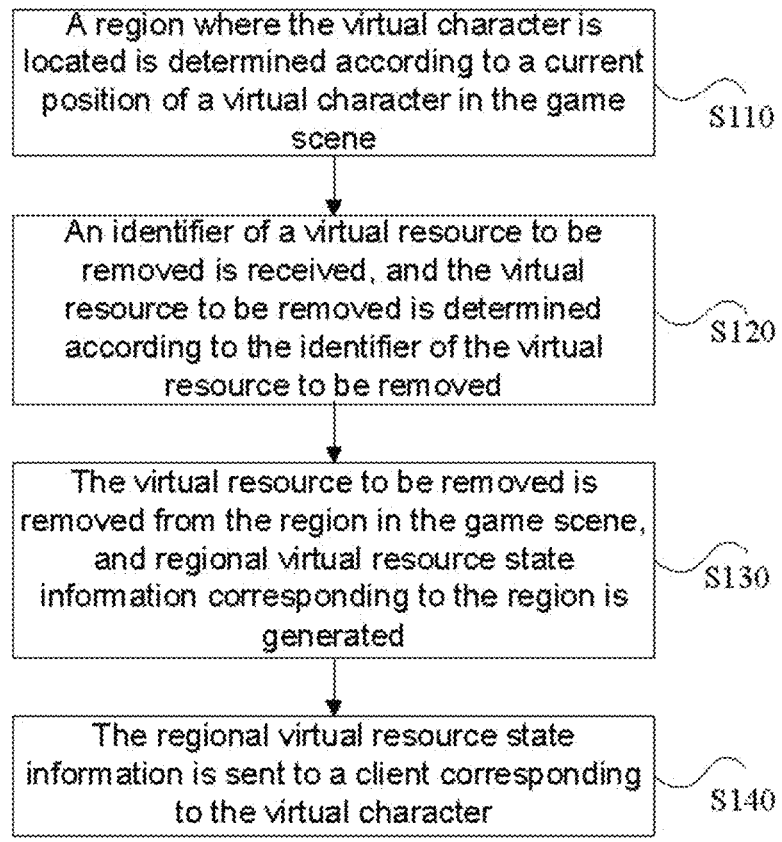

```
┌─────────────────────────────────────┐
│  A region where the virtual character is │
│ located is determined according to a current │── S110
│  position of a virtual character in the game │
│              scene                  │
└─────────────────────────────────────┘
                  ↓
┌─────────────────────────────────────┐
│  An identifier of a virtual resource to be │
│   removed is received, and the virtual │
│  resource to be removed is determined │── S120
│  according to the identifier of the virtual │
│       resource to be removed        │
└─────────────────────────────────────┘
                  ↓
┌─────────────────────────────────────┐
│  The virtual resource to be removed is │
│  removed from the region in the game scene, │
│  and regional virtual resource state │── S130
│  information corresponding to the region is │
│             generated               │
└─────────────────────────────────────┘
                  ↓
┌─────────────────────────────────────┐
│   The regional virtual resource state │
│ information is sent to a client corresponding │── S140
│          to the virtual character   │
└─────────────────────────────────────┘
```

Fig. 1

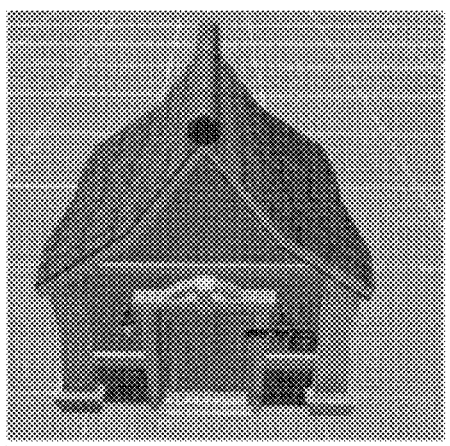
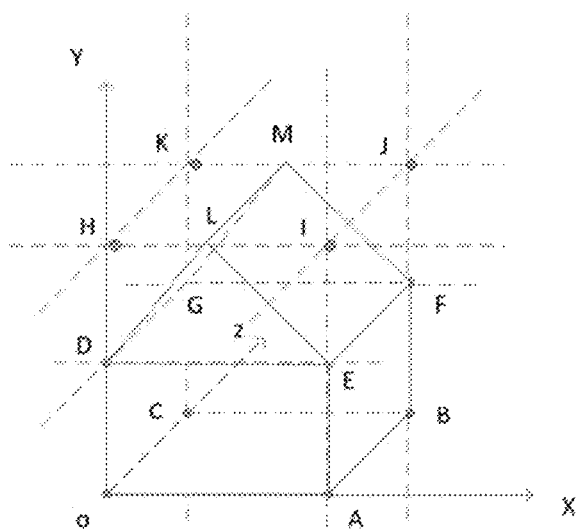

Fig. 2

PROCESSING METHOD AND APPARATUS FOR VIRTUAL RESOURCE IN GAME SCENE

The present application claims benefit of Chinese Patent Application No. 201810092813.6, filed to the China. Patent Office on Jan. 30, 2018, entitled "Processing Method and Apparatus for Virtual Resource in Game Scene", the contents of which are hereby incorporated by reference in its entirety.

TECHNICAL FIELD

The present disclosure relates to the technical field of games, and in particular to a processing method and apparatus for virtual resource in a game scene.

BACKGROUND

In the wave of the Internet, the continuous development and evolution of hardware and software technologies have promoted the emergence of smart devices and software. At the same time, a large number of games with different themes have emerged to meet the needs of users.

There are currently many different themes and play types in game applications running on terminals, and the combination of a variety of different game plays to improve the playability of games is currently the development direction of the field. For example, combining a shooting type game with a construction type game, combining a strategy game with a parkour game, and so on.

For a game type that combines a shoot type game with a build type game, complex gameplay is often not realized or greatly limited by terminals with limited computing capabilities, such as construction gameplay in the game. Since there are a large number of detachable and buildable models in the game scene, all the models will occupy a very large memory, and terminals with smaller memory cannot bear. Even with enough memory, so many trivial subdivision models may put a lot of pressure on the terminal in terms of data processing and graphics rendering.

It should be noted that the information disclosed in the Background section above is only used to enhance an understanding of the background of the present disclosure, and thus may include information that does not constitute the conventional art known to those of ordinary skill in the art.

SUMMARY

At least some embodiments of the present disclosure provides a processing method and apparatus for a virtual resource in a game scene, so as to at least partially solve at least one problem due to limitations and disadvantages of the related art.

In an embodiment of the present disclosure, a processing method for a virtual resource in a game scene is provided. The method may include that:

a region where the virtual character is located is determined according to a current position of a virtual character in the game scene;

an identifier of a virtual resource to be removed is received, and the virtual resource to be removed is determined according to the identifier of the virtual resource to be removed;

the virtual resource to be removed is removed from the region in the game scene, and regional virtual resource state information corresponding to the region is generated; and the regional virtual resource state information is sent to a client corresponding to the virtual character, so that the client renders and displays the virtual resource corresponding to the regional virtual resource state information according to the regional virtual resource state information.

In another embodiment of the present disclosure, a processing method for a virtual resource in a game scene is provided. The method may include that:

in response to a removing event of the virtual resource in the game scene, a virtual resource is determined as a virtual resource to be removed from a plurality of virtual resources in the game scene;

an identifier of the virtual resource to be removed is sent to a server;

regional virtual resource state information returned from the server is received, the regional virtual resource state information being virtual resource state information in a region where the virtual character is located, which is determined by the server according to a current position of the virtual character; and the state of the virtual resource in the region is updated according to the regional virtual resource state information, and the virtual resource corresponding to the regional virtual resource state information is rendered and displayed according to the updated state of the virtual resource.

In another embodiment of the present disclosure, a processing apparatus for a virtual resource in a game scene is provided. The apparatus may include:

a first determination module, configured to determine a region where the virtual character is located according to a current position of a virtual character in the game scene;

a second determination module, configured to receive an identifier of a virtual resource to be removed, and determine the virtual resource to be removed according to the identifier of the virtual resource to be removed;

a first update module, configured to delete the virtual resource to be removed from the region in the game scene, and generate regional virtual resource state information corresponding to the region; and a first sending module, configured to send the regional virtual resource state information to a client corresponding to the virtual character, so that the client renders and displays the virtual resource corresponding to the regional virtual resource state information according to the regional virtual resource state information.

In another embodiment of the present disclosure, a processing apparatus for a virtual resource in a game scene is provided. The apparatus may include:

a third determination module, configured to, in response to a removing event of the virtual resource in the game scene, determining a virtual resource as a virtual resource to be removed from multiple virtual resources in the game scene;

a second sending module, configured to send an identifier of the virtual resource to be removed to a server;

a first receiving module, configured to receive regional virtual resource state information returned from the server, wherein the regional virtual resource state information being virtual resource state information in a region where the virtual character is located, which is determined by the server according to a current position of the virtual character; and a second update module, configured to update the state of the virtual resource in the region according to the regional virtual resource state information, and render and display the virtual resource corresponding to the regional virtual resource state information according to the updated state of the virtual resource.

In another embodiment of the present disclosure, a game system is provided. The system may include a server and a client.

The server may include: a first processor; and a first memory, configured to store a first executable instruction of the first processor.

The first processor may be configured to execute the above processing method for a virtual resource in a game scene by executing the first executable instruction.

The client may include: a second processor; and a second memory, configured to store a second executable instruction of the second processor.

The second processor may be configured to execute the above processing method for a virtual resource in a game scene by executing the second executable instruction.

In another embodiment of the present disclosure, an electronic device is provided. The electronic device may include:

a processor; and a memory, configured to store an executable instruction of the processor.

The processor may be configured to execute the above processing method for a virtual resource in a game scene by executing the executable instruction.

In another embodiment of the present disclosure, an electronic device is provided. The electronic device may include:

a processor; and a memory, configured to store an executable instruction of the processor.

The processor may be configured to perform the above processing method for a virtual resource in a game scene by executing the executable instruction.

In another embodiment of the present disclosure, a computer-readable storage medium is provided. A computer program may be stored thereon. The computer program may be executed by a processor to implement the above processing method for a virtual resource in a game scene.

In another embodiment of the present disclosure, an electronic device is provided. The electronic device may include:

a processor; and a memory, configured to store an executable instruction of the processor.

The processor may be configured to execute the above processing method for a virtual resource in a game scene by executing the executable instruction.

In another embodiment of the present disclosure, a computer-readable storage medium is provided. A computer program may be stored thereon. The computer program may be executed by a processor to implement the above processing method for a virtual resource in a game scene.

In another embodiment of the present disclosure, a computer-readable storage medium is provided. A computer program may be stored thereon. The computer program may be executed by a processor to implement the above processing method for a virtual resource in a game scene.

BRIEF DESCRIPTION OF THE DRAWINGS

The above and other features and advantages of the present disclosure will become more apparent from the detailed description of exemplary embodiments with reference to the drawings. It is apparent that the drawings in the following description are some embodiments of the present disclosure, and other drawings can be obtained from those skilled in the art according to these drawings without any creative work. In the drawings:

FIG. 1 is a flowchart of a processing method for a virtual resource in a game scene according to an embodiment of the present disclosure;

FIG. 2 is a schematic diagram of a virtual resource three-dimensional reconstruction mapping relationship in an exemplary embodiment of the present disclosure;

DETAILED DESCRIPTION

Figure 3:
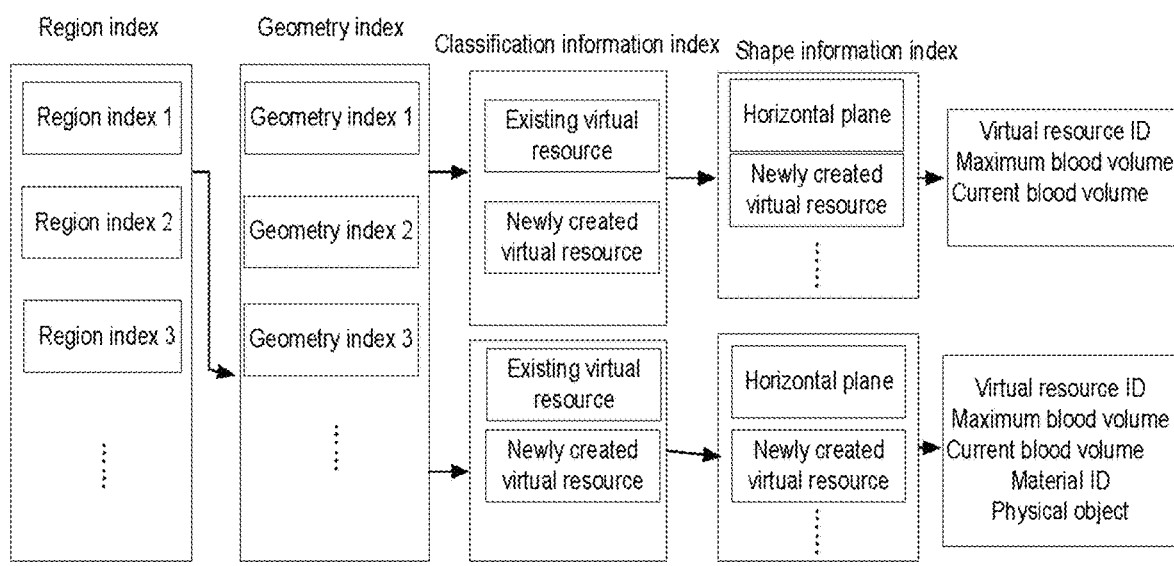
FIG. 3 is a schematic diagram of a virtual resource state index table in an exemplary embodiment of the present disclosure.

It is to be noted that in the case of no conflict, the features in the embodiments and the embodiments in the present application may be combined with each other. The present invention is described below with reference to the drawings and in conjunction with the embodiments in detail.

In order to make those skilled in the art better understand the solutions of the present invention, the technical solutions in the embodiments of the present invention will be clearly and completely described below with reference to the drawings in the embodiments of the present invention. It is apparent that the described embodiments are only a part of the embodiments of the present invention, not all of the embodiments. On the basis of the embodiments of the present invention, all other embodiments obtained on the premise of no creative work of those of ordinary skill in the art should fall within the scope of protection of the present invention.

It is to be noted that the specification and claims of the invention and the terms "first", "second" and the like in the drawings are used to distinguish similar objects, and do not need to describe a specific sequence or a precedence order. It will be appreciated that data used in such a way may be exchanged under appropriate conditions, in order that the embodiments of the present invention described here can be implemented. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

It is also to be noted that various triggering events disclosed in the specification may be preset, and different triggering events may trigger to execute different functions.

The embodiment of the present disclosure provides a processing method for a virtual resource in a game scenario. An execution entity of the method is a server, and the server may be any server device such as one or more computers, servers, and clusters. FIG. 1 is a flowchart of a processing method for a virtual resource in a game scene according to an embodiment of the present invention. As shown in FIG. 1, in the present embodiment, the method includes the following steps.

At step S110, a region where the virtual character is located is determined according to a current position of a virtual character in the game scene.

At step S120, an identifier of a virtual resource to be removed is received, and the virtual resource to be removed is determined according to the identifier of the virtual resource to be removed.

At step S130, the virtual resource to be removed is removed from the region in the game scene, and regional virtual resource state information corresponding to the region is generated.

At step S140, the regional virtual resource state information is sent to a client corresponding to the virtual character, so that the client renders and displays the virtual resource corresponding to the regional virtual resource state information according to the regional virtual resource state information.

Through the above implementation manner, a region where the virtual character is located is determined according to a current position of a virtual character in the game scene, a corresponding virtual resource is loaded in the game scene according to the range of the region, and the state of the virtual resource in the game scene is updated in a unit of the region, which effectively reduces resource consumption and can greatly reduce the pressure of data processing.

Each step of the processing method for a virtual resource in the game scene in the present exemplary embodiment will be further described below.

In the present exemplary embodiment, the game scene may be a square or other shapes, such as a circle and the like. The game scene may include ground, mountains, rocks, flowers, grass, trees, buildings, and the like.

The game scene includes at least one virtual resource, which may be a construct built in the game scene, such as a house, a horizontal plane, a vertical plane, a slope, a table, a chair, a street lamp, and the like. The virtual resource may be presented by a graphical user interface of a client. The presented content may include the virtual resource globally or locally.

The game scene includes at least one virtual character and may be presented by the graphical user interface of the client. The presented content may include the virtual character globally or locally. For example, in a third person perspective game, the content presented by the graphical user interface may include the entire part of the virtual character. For another example, in a first person perspective game, the content presented by the graphical user interface may include part of the virtual character.

The virtual character may be a virtual character of an enemy camp, or may be a virtual character of an own camp. The virtual character may perform corresponding actions in the game scene in response to an operation of a user. For example, the user may control the virtual character to walk, run, squat, bend, attack, shoot, etc. in the game scene. The present invention is not limited herein.

In an optional implementation manner, at step S110, according to a current position of a virtual character in the game scene, a region where the virtual character is located is determined.

A server monitors a current position of a virtual character in the game scene in real time. In the game scene, the virtual character can change the movement direction of the virtual object according to the user's touch operation on the client, so that it can move freely, and causing the position change of the virtual character in the game scene.

According to a current position of a virtual character in the game scene, a region where the virtual character is located is determined. The region may be a circular range region in the game scene centered on a position where the virtual character is located, and a radius of a preset distance, or a region with any shape containing the current position where the virtual character is located, and may also be obtained by dividing the game scene into multiple regions in advance, and determining a preset region to which the current position of the virtual character in the game scene belongs.

In an optional implementation manner, the game scene is divided into multiple regions, and each of the regions is respectively provided with a regional version number, where the regional version number is used to identify current state information of the virtual resource in the region.

It should be noted that the game scene is divided into multiple regions, which are logical game scene regions, the division of the regions may be invisible or visible to a player, and the region is used for regionally manage to the game scene and a model in the game scene. Thus, resource consumption is effectively reduced, and the pressure of data processing can be greatly reduced.

In order to characterize new/given virtual resource state information in each region, the server maintains a regional version number for each region. The regional version number may be a positive natural integer. When the state of the virtual resource in each region changes, the regional version number may iteratively change according to a preset rule. The manner of iterating the regional version number may be: incrementing the regional version number by 1, decrementing the regional version number by 1, or adding a unique identifier to the regional version number, and so on. Therefore, the new/given virtual resource state information in the region is identified by the regional version number. For example, the regional version number of a region Z is 2, and when the state of a virtual resource in the region Z is changed, the regional version number of the region Z is iterated to 3, and the regional virtual resource state information corresponding to the regional version number 3 of the region Z is the current state information of the virtual resource in the region Z.

In an optional implementation manner, after step S110, the method further includes the following steps.

At step S1101, it is determined whether the virtual character enters the region for the first time.

At step S1102, in response to that the virtual character enters the region for the first time, the current regional version number of the region is saved as the virtual character regional version information, and the regional virtual resource state information corresponding to the current regional version number of the region is sent to the client corresponding to the virtual character.

At step S1103, in response to that the virtual character does not enter the region for the first time, the virtual character regional version information corresponding to the virtual character is acquired.

At step S1104, the virtual character regional version information is matched with the current regional version number of the region.

At step S1105, in response to that the virtual character regional version information is different from the current regional version number of the region, the regional virtual resource state information corresponding to the current regional version number of the region is sent to the client corresponding to the virtual character.

The server maintains a regional version number for each region, and also maintains regional version information of a region it passes through for each virtual character. When a virtual character enters a region for the first time, the server saves a current regional version number of the region as virtual character regional version information, and sends regional virtual resource state information corresponding to the current regional version number of the region to a client corresponding to the virtual character, so that the client loads virtual resources in the region according to the regional virtual resource state information. In response to that the virtual character enters the region again, virtual character regional version information of the region corresponding to the virtual character is acquired, and the virtual character regional version information is matched with the current regional version number of the region. If they are not consistent, the server sends regional virtual resource state information corresponding to the current regional version number of the region to a client corresponding to the virtual character, so that the client updates related information buffered locally and/or loads virtual resources in the region according to the regional virtual resource state information.

For example, the server maintains a regional version number 2 for the region Z, when the character a which is manipulated by a client a enters the region Z for the first time, the server saves the current regional version number 2 of the region Z as regional version information of the region Z corresponding to the character a, and sends regional virtual resource state information corresponding to the regional version number 2 of the region Z to a client a corresponding to the character a. When the state of a virtual resource in the region Z changes, the current regional version number of the region Z is changed to 3. When the character a enters the region Z again, the virtual character regional version information of the region Z corresponding to the character a is obtained as 2. Since the virtual character regional version information is different from the current regional version number of the region Z, the server sends the regional virtual resource state information corresponding to the current regional version number 3 of the region Z to the client a corresponding to the character a.

In an optional implementation manner, the server maintains a regional version number for each region, and also maintains regional version information of a region it passes through for each virtual character. When a virtual character enters a region for the first time, the server saves a current regional version number of the region as virtual character regional version information, determines whether the current regional version number of the region is consistent with an initial regional version number, and sends, if not, regional virtual resource state information corresponding to the current regional version number of the region to a client corresponding to the virtual character, so that the client loads virtual resources in the region according to the regional virtual resource state information. In response to that the virtual character enters the region again, virtual character regional version information of the region corresponding to the virtual character is acquired, and the virtual character regional version information is matched with a current regional version number of the region. If they are not consistent, the server sends regional virtual resource state information corresponding to the current regional version number of the region to a client corresponding to the virtual character, so that the client updates related information buffered locally and/or loads virtual resources in the region according to the regional virtual resource state information.

For example, an initial regional version number assigned to the region Z by the server is 1, and a current regional version number of the region Z is 2, when the character a which is manipulated by a client a enters the region Z for the first time, the server saves the current regional version number 2 of the region Z as regional version information of the region Z corresponding to the character a. Since the current regional version number of the region Z is inconsistent with the initial regional version number, regional virtual resource state information corresponding to the regional version number 2 of the region Z is sent to a client a corresponding to the character a. When the state of a virtual resource in the region Z changes, the current regional version number of the region Z is changed to 3. When the character a enters the region Z again, the virtual character regional version information of the region Z corresponding to the character a is obtained as 2. Since the virtual character regional version information is different from the current regional version number of the region Z, the server sends the regional virtual resource state information corresponding to the current regional version number 3 of the region Z to the client a corresponding to the character a.

Through the above implementation manner, by setting a regional version number, the synchronization of virtual resource state information in a region and the regional management of models in the game scene are achieved, so that a corresponding client is prevented from continuously refreshing the state when a virtual character repeatedly entering a certain region, effectively reducing resource consumption, greatly reducing the pressure of data processing, and improving the data synchronization efficiency.

In an optional implementation manner, at step S120, an identifier of a virtual resource to be removed is received, and the virtual resource to be removed is determined according to the identifier of the virtual resource to be removed.

The virtual resources in the game scene are assigned with a unique identifier, such as a global ID or a serial number, and the like. After the server receives the identifier of the virtual resource to be removed sent by the client, a virtual resource corresponding to the identifier is queried locally and acquired according to the identifier.

In an optional implementation manner, a name-ID mapping table is maintained on the client side, the table stores the names of all virtual resources in the game scene and the ID assigned to the virtual resources, and a mapping relationship between names and IDs is given in the table. When a removing event is detected on the client, the name of the virtual resource to be removed is acquired, the ID corresponding to the virtual resource is acquired from the name-ID mapping table according to the name of the virtual resource, and the client sends the ID of the virtual resource to the server. After receiving the virtual resource ID sent by the client, the server locally queries and acquires the virtual resource corresponding to the ID according to the virtual resource ID.

The global ID is mainly used for client and server communication. This is because when a unique name of the virtual resource in the scene is used for communication, the name is usually very long, which wastes player traffic, so a 4-byte integer is used to uniquely identify the virtual resource for communication.

In an optional implementation manner, when the game is running, the server sends initialization information to the client, and assigns a unique global ID to each virtual resource in the game scene. When the client receives the initialization information, an entity object is created for each virtual resource to manage each virtual resource. Meanwhile, the client also acquires all the virtual resources that have been loaded, and binds these virtual resources to the corresponding entities. This enables the entity to control the virtual resource.

Through the above implementation manner, specific virtual resource information is replaced by an ID, and the efficiency of data transmission can be effectively improved.

In an implementation manner, at step S130, the virtual resource to be removed is removed from the region in the game scene, and regional virtual resource state information corresponding to the region is generated.

The server maintains the state information of all the virtual resources existing in the game scene. After determining a virtual resource to be removed, the virtual resource to be removed may be directly deleted from the region determined by the current position of the virtual character in the game scene, or when it is detected that the virtual resource to be removed meets a preset condition, the virtual resource to be removed is removed from the region determined by the current position of the virtual character in the game scene, and regional virtual resource state information corresponding to the region is generated, where the regional virtual resource state information may include current state information of all virtual resources in the corresponding region, including: whether it is removed, the material of the virtual resources, the remaining blood volume, and the like; or, the regional virtual resource state information may include the current state information of all the virtual resources in the corresponding area, including: the material of the virtual resource, the remaining blood volume, and the like; or, the regional virtual resource state information may include current state information of the state-changed virtual resources in the corresponding region.

For example, virtual resources A, B, C, and D exist in the region, which is set to be the region Z and determined according to the current position of the virtual character, when an identifier of a virtual resource to be removed is received and it is determined that the virtual resource to be removed is the virtual resource A, the virtual resource is removed from the region Z in the game scene, that is, the virtual resources B, C and D exist in the region Z currently after deletion. Meanwhile, regional virtual resource state information corresponding to the region Z is generated, and the information may include the following content: virtual resource A: removed; virtual resource B: normal; virtual resource C: normal; virtual resource D: normal; or, the information may include the following content: virtual resource B: normal; virtual resource C: normal; virtual resource D: normal; or, the information may include the following content: virtual resource A: removed.

In an implementation manner, before the virtual resource to be removed is removed from the region in the game scene at step S130, the method further includes that: it is detected that the virtual resource to be removed meets a preset condition.

The preset condition may be set in advance by a developer according to the actual situation. When it is detected that the virtual resource to be removed meets the preset condition, the virtual resource to be removed is removed from the region in the game scene. For example, when it is detected that the current remaining blood volume of the virtual resource to be removed is 0, the virtual resource to be removed is removed from the region in the game scene. For another example, when it is detected that the virtual resource to be removed is attacked by a specific attack mode, such as, the virtual character is in a direct removing mode or the virtual resource to be removed is attacked by a removing weapon, the virtual resource to be removed is removed from the region in the game scene, etc.

For example, the virtual resources A, B, C, and D exist in the region which is set to be the region Z and determined by the current position of the virtual character, such as the virtual resource A: normal, remaining blood volume 60%; virtual resource B: normal, remaining blood volume 100%; virtual resource C, remaining blood volume 100%: normal; virtual resource D, remaining blood volume 100%. When the identifier of the virtual resource to be removed is received and it is determined that the virtual resource to be removed is the virtual resource A, it is detected whether the remaining blood volume of the virtual resource A is 0, and when the remaining blood volume of the virtual resource A is 0, the virtual resource is removed from the region Z in the game scene, that is, the virtual resources B, C and D exist in the region Z currently after deletion. Meanwhile, regional virtual resource state information corresponding to the region Z is generated, and the information may include the following content: virtual resource A: removed; virtual resource B: normal, remaining blood volume 100%; virtual resource C, remaining blood volume 100%: normal; virtual resource D, remaining blood volume 100%; or, the information may include the following content: virtual resource B: normal, remaining blood volume 100%; virtual resource C, remaining blood volume 100%: normal; virtual resource D, remaining blood volume 100%; or, the information may include the following content: virtual resource A: removed.

For example, virtual resources A, B, C, and D exist in the region, which is set to be the region Z and determined by the current position of the virtual character. When an identifier of a virtual resource to be removed is received and it is determined that the virtual resource to be removed is the virtual resource A, when it is detected that the virtual resource A is attacked by a removing weapon, such as a hoe, a hammer, and the like, or when it is detected that the virtual character is in a direct removing mode, the virtual resource is removed from the region Z in the game scene, that is, the virtual resources B, C and D exist in the region Z currently after deletion. Meanwhile, regional virtual resource state information corresponding to the region Z is generated, and the information may include the following content: virtual resource A: removed; virtual resource B: normal; virtual resource C: normal; virtual resource D: normal; or, the information may include the following content: virtual resource B: normal; virtual resource C: normal; virtual resource D: normal; or, the information may include the following content: virtual resource A: removed.

In an implementation manner, before regional virtual resource state information corresponding to the region is generated at step S130, the method further includes the following steps.

At step S1301, adjacent virtual resources that have an adjacent relationship with the virtual resource to be removed are determined.

At step S1302, an adjacent relationship tabletable of the adjacent virtual resources is acquired, and the virtual resource to be removed is removed from the adjacent relationship tabletable.

At step S1303, according to the adjacent relationship tabletable, it is determined whether the adjacent virtual resources are connected to the ground. If the adjacent virtual resources cannot be connected to the ground, the adjacent virtual resources are deleted from the region in the game scene.

The adjacent virtual resources adjacent to the virtual resource to be removed are determined. The adjacent virtual resources may be directly adjacent to the virtual resource to be removed, or may be indirectly adjacent to the virtual resource to be removed. That is, the adjacent relationship includes a direct adjacent relationship and an indirect adjacent relationship. The direct adjacent relationship means that two virtual resources have a common edge, or one face of one virtual resource is connected to the surface of another virtual resource, or one point of one virtual resource is connected to the surface of another virtual resource. For example, the virtual resource A is a horizontal plane, and the virtual resource B is also a horizontal plane. When the virtual resource A and the virtual resource B are juxtaposed together and the sides of the two horizontal planes are attached together, the two horizontal planes are considered to be directly adjacent. In other words, the virtual resource C is a vertical plane. When the side of the virtual resource A and the front side of the virtual resource C are combined to form a vertical wall and ground or a vertical wall and top surface of the house, the virtual resource A and the virtual resource C are considered to be directly adjacent. The indirect adjacent relationship means that two virtual resources have the same virtual resource with direct adjacent relationship. For example, the virtual resource A is a horizontal plane, the virtual resource B is also a horizontal plane, a virtual resource D in the direction of a horizontal plane exists between the virtual resource A and the virtual resource B, the two sides of the virtual resource D are directly adjacent to the virtual resource A and the virtual resource B, respectively, and then it is considered that there is an indirect adjacent relationship between the virtual resource A and the virtual resource B.

The server maintains an adjacent relationship table for each virtual resource in the game scene. The adjacent relationship table records an identifier of adjacent virtual resources corresponding to each virtual resource that currently adjacent to the virtual resource in real time. When a certain virtual resource in the game scene is determined to be the virtual resource to be removed, adjacent virtual resources of the virtual resource are determined, an adjacent relationship table of the adjacent virtual resources is obtained, and the virtual resource to be removed is removed from the adjacent relationship table.

For example, the virtual resource A is adjacent to the virtual resource B, and the virtual resource B is adjacent to the virtual resource C and the virtual resource D. When the virtual resource to be removed is determined as the virtual resource A, an adjacent virtual resource of the virtual resource A is determined as the virtual resource B, and an adjacent relationship table of the virtual resource B is acquired, the list information including: the virtual resource A, the virtual resource C, and the virtual resource D. The virtual resource A is removed from the adjacent relationship table. In this case, the adjacent relationship table of the virtual resource B includes: the virtual resource C and the virtual resource D.

By querying the adjacent relationship table, the adjacent virtual resources of each virtual resource may be quickly acquired without detecting each time, which improves the efficiency of data processing.

In an optional implementation manner, during initialization of a game, the server starts an initialization terminal that is only used for data export. The initialization terminal will load the latest scene resource, create a camera, traverse each virtual resource in the game scene using the camera, and acquire a collision body of each virtual resource. One implementation manner is: using the collision body to perform collision detection, thereby obtaining adjacent virtual resources of each virtual resource, and establishing an adjacent relationship table of each virtual resource. Another implementation manner is: if the virtual resources are spliced with each other or have a small gap, the collision detection will fail, and there is no direct contact between models due to the error of model construction. In this case, these adjacent collision bodies are not detected. Therefore, before the collision detection, the position of the collision body, the size of the collision body, and a world rotation matrix are first acquired. According to the information, a box collision body is newly created at the position of the original collision body, and the collision body is enlarged by a preset value, such as 1.1 times of the original collision body or enlarge the original collision body by 5.5 cm. The newly created collision body is used to perform collision detection, all other collision bodies that collide with the collision body are obtained, and corresponding virtual resource identifiers are determined according to the other collision bodies that colliding with the collision body, thereby obtaining adjacent virtual resources of each virtual resource, and establishing an adjacent relationship table of each virtual resource.

In an optional implementation manner, the adjacent relationship table corresponding to each virtual resource includes a grounding information identifier. For example, the identifier is 1, indicating that the virtual resource is connected to the ground, and the identifier is 0, indicating that the virtual resource cannot be connected. By reading the value of the grounding information identifier, it can be determined whether each adjacent virtual resource of the virtual resource to be removed is connected to the ground, and if the adjacent virtual resource cannot be connected to the ground, the adjacent virtual resource is removed from the region in the game scene and the adjacent virtual resource is determined as the virtual resource to be removed, and then perform Step S1301 repeatedly.

For example, the virtual resource A is adjacent to the virtual resource B, the virtual resource B is adjacent to the virtual resource C and the virtual resource D, and the virtual resource D is adjacent to the virtual resource E, where only the virtual resource E is connected to the ground. When the virtual resource to be removed is determined as the virtual resource A, an adjacent virtual resource of the virtual resource A is determined as the virtual resource B, and an adjacent relationship table of the virtual resource B is acquired, the list information including: the virtual resource A, the virtual resource C, the virtual resource D, and the grounding information identifier 1, this is because the virtual resource D may be connected to the ground via the virtual resource E. The virtual resource A is removed from the adjacent relationship table. In this case, the adjacent relationship table of the virtual resource B includes: the virtual resource C, the virtual resource D and the grounding information identifier 1. The grounding information identifier is 1 by determining the grounding information identifier in the adjacent relationship table of the virtual resource B. That is, the virtual resource B may be connected to the ground via the virtual resource D. Therefore, the virtual resource B is not removed.

For example, the virtual resource A is adjacent to the virtual resource B, the virtual resource B is adjacent to the virtual resource C and the virtual resource D, and the virtual resource D is adjacent to the virtual resource E, where there is no virtual resource connected to the ground. When the virtual resource to be removed is determined as the virtual resource A, an adjacent virtual resource of the virtual resource A is determined as the virtual resource B, and an adjacent relationship table of the virtual resource B is acquired, the list information including: the virtual resource A, the virtual resource C, the virtual resource D, and the grounding information identifier 0. The virtual resource A is removed from the adjacent relationship table. In this case, the adjacent relationship table of the virtual resource B includes: the virtual resource C, the virtual resource D and the grounding information identifier 0. The grounding information identifier is 0 by determining the grounding information identifier in the adjacent relationship table of the virtual resource B. That is, the virtual resource B cannot be connected to the ground. Therefore, the adjacent virtual resource B is removed from the region in the game scene, the adjacent virtual resource B is determined as the virtual resource to be removed, the adjacent virtual resource of the virtual resource B is determined as the virtual resource E, the adjacent relationship table of the virtual resource E is acquired, and the above step is repeatedly performed until all adjacent virtual resources are traversed.

By the above implementation manner, after a virtual resource to be removed is determined, other virtual resources to be removed which meet conditions are automatically determined according to a preset adjacent relationship, thereby reducing the occupation of system data processing resources. Based on this manner, after the user removes the virtual resource to be removed, other adjacent virtual resources to be removed which meet conditions are removed jointly, thereby achieving the effect of conforming to building collapse in the real world, and improving the game experience of the user.

In an implementation manner, at step S130, the virtual resource to be removed is removed from the region in the game scene, and regional virtual resource state information corresponding to the region is generated, and the method further includes the following steps.

At step S1304, the virtual resource to be removed is removed from the region in the game scene.

At step S1305, a regional version number corresponding to the region is iterated and determined as a current regional version number of the region.

At step S1306, regional virtual resource state information is updated, according to the current regional version number of the region.

After the server removes the virtual resource to be removed from the region in the game scene, since the virtual resource state in the region changes, the server iterates a regional version number corresponding to the region, determines as a current regional version number of the region, and updates regional virtual resource state information corresponding to the current regional version number of the region, where the mode of iterating the regional version number may be: incrementing the regional version number by 1, decrementing the regional version number by 1, or adding a unique identifier to the regional version number, and so on.

In an optional implementation manner, the server sends the regional virtual resource state information to clients corresponding to all virtual characters in the region, so that the clients corresponding to all the virtual characters in the region update and display the state of virtual resources in the region, and clients corresponding to all virtual characters outside the region do not update the state of the virtual resources in the region. Instead, when a virtual character outside the region enters the region, asynchronous update by the matching of the virtual character regional version information of the virtual character and the current regional version number of the region.

For example, an initial regional version number assigned to the region Z by the server is 1, and a current regional version number of the region Z is 2. There are currently three virtual resources in the region Z, namely, virtual resource A, B, and C, respectively. There are currently three characters in the region Z, namely, character a, b, and c. There is still one character d outside the region Z. The regional virtual resource state information corresponding to the regional version number 2 is: virtual resource A: normal; virtual resource B: normal; virtual resource C: normal; virtual resource D: normal. When it is detected that the character a removes the virtual resource A in the region Z, the current regional version number of the region Z is changed to 3, and the updated regional virtual resource state information is: virtual resource A: removed; virtual resource B: normal; virtual resource C: normal; virtual resource D: normal; or the updated regional virtual resource state information is: virtual resource B: normal; virtual resource C: normal; virtual resource D: normal; or the updated regional virtual resource state information is: virtual resource A: removed. The server sends the regional virtual resource state information to clients a, b, and c corresponding to all the characters a, b, and c in the region Z, so that the clients corresponding to all the characters in the region Z update and display the state of virtual resources in the region Z. Since the character d is outside the region Z, the client d corresponding to the character d does not receive the regional virtual resource state information or ignores receiving of the regional virtual resource state information. Therefore, the state of the virtual resources in the region Z is not updated or displayed. When the character d enters the region Z for the first time, the server saves the current regional version number 3 of the region Z as the regional version information of the region Z corresponding to the character d. If the current regional version number of the region Z is different from the initial regional version number, the regional virtual resource state information corresponding to the regional version number 3 of the region Z is sent to the client d corresponding to the character d, so that the client d updates and displays the state of the virtual resources in the region Z. When the role d is not entering the region Z for the first time, the virtual character regional version information of the region Z corresponding to the character d is 2. Since the virtual character regional version information is different from the current regional version number of the region Z, the server sends the regional virtual resource state information corresponding to the current regional version number 3 of the region Z to the client d corresponding to the character d, so that the client d updates and displays the state of the virtual resources in the region Z.

Through the above implementation manner, by setting a regional version number, the synchronization of virtual resource state information in a region and the regional management of models in a game scene are achieved, when the state of a virtual resource changes, clients in the region are synchronized in real time, and clients outside the region are asynchronized, thereby effectively reducing resource consumption, greatly reducing the pressure of data processing, and improving the data synchronization efficiency.

In an optional implementation manner, at step S140, the regional virtual resource state information is sent to a client corresponding to the virtual character, so that the client renders and displays the virtual resource corresponding to the regional virtual resource state information according to the regional virtual resource state information.

The server sends the regional virtual resource state information to a client corresponding to the virtual character, so that the client updates the state of the virtual resource in the region according to the regional virtual resource state information, and renders and displays the virtual resource corresponding to the regional virtual resource state information according to the updated state of the virtual resource.

For example, the state of the virtual resource in the region Z saved locally by the client a is: virtual resource A: normal; virtual resource B: normal; virtual resource C: normal; virtual resource D: normal; the server sends the regional virtual resource state information to the client a, the regional virtual resource state information being: virtual resource A: removed; virtual resource B: normal; virtual resource C: normal; virtual resource D: normal; or the regional virtual resource state information being: virtual resource B: normal; virtual resource C: normal; virtual resource D: normal; or the regional virtual resource state information being: virtual resource A: removed. The client a updates the state of the virtual resource in the region according to the regional virtual resource state information, that is, the state of the virtual resource A is changed from normal to removed, and a removing animation of the virtual resource A is rendered and displayed in a graphical user interface of a client A.

In an optional implementation manner, the server sends the regional virtual resource state information to a client corresponding to the virtual character, and clients corresponding to all virtual characters in the region, so that the client updates the state of the virtual resources in the region according to the regional virtual resource state information, and renders and displays the virtual resources corresponding to the regional virtual resource state information according to the updated state of the virtual resource.

In an optional implementation manner, the virtual resource corresponding to the regional virtual resource state information is rendered and displayed according to the updated state of the virtual resource, where the state of the virtual resource is determined by virtual resource state information, and the virtual resource state information includes the current state of the virtual resource, such as: whether it is removed, the material of the virtual resource, the remaining blood volume, and so on.

For example, the virtual resource state information of the virtual resource A is: virtual resource A: normal, the normal state of the virtual resource is rendered and displayed in the graphical user interface of the client; if the virtual resource state information of the virtual resource A is: virtual resource A: removed, or the virtual resource A does not exist in the current virtual resource state information, the virtual resource is hidden or deleted after the removing animation of the virtual resource is rendered and displayed in the graphical user interface of the client; if the virtual resource state information of the virtual resource A is: virtual resource A: remaining blood volume 20%, the virtual resource is rendered and displayed in the graphical user interface of the client, and a display effect such as a crack or a gap is added to the virtual resource.

Through the above implementation manner, according to a current position of a virtual character in a game scene, a region where the virtual character is located is determined, corresponding virtual resources are loaded in the game scene according to the range of the region, and the state of the virtual resources in the game scene are updated in a unit of region, which effectively reduces resource consumption and can greatly reduce the pressure of data processing.

In an optional implementation manner, the method further includes the following steps.

At step S150, a virtual resource state index table is established for the multiple virtual resources in the game scene, where the virtual resource state index table includes at least: a virtual resource identifier corresponding to each virtual resource and virtual resource state information of each virtual resource.

At step S160, the virtual resource state index table is synchronized to the client.

It should be noted that step S150 and step S160 may be performed as an initialization step before step S110, or may be performed as a reset step before, after or during any step.

Considering the convenience of the client to access the storage structure of the removed data, when synchronizing the virtual resource state information of a certain region, it is possible to quickly locate which virtual resources exist in the region, the server establishes a virtual resource state index table for multiple virtual resources existing in the game scene, and the virtual resource state index table is a multi-level indexed storage data structure for storing state information of all virtual resources in the game scene, where the virtual resource state index table includes at least: a virtual resource identifier corresponding to each virtual resource and virtual resource state information of each virtual resource. The virtual resource state index table is synchronized to the client, so that the client quickly locates the virtual resource, and the server may also use the virtual resource state index table established by itself or separately maintain the state information of multiple virtual resources that exist in the game scene.

In an optional implementation manner, the game scene includes a composite model composed of at least two virtual resources, where high-bit information in the virtual resource identifier is used to identify the composite model, and low-bit information in the identifier is used to identify the virtual resources constituting the composite model.

The multiple virtual resources in the game scene may be spliced together to form a composite model. For example, two horizontal plane virtual resources and four vertical plane virtual resources may be spliced together to form a house, and the house is a composite model.

In an optional implementation manner, in order to identify that the virtual resource in the game scene is a sub-model in the composite model, or an independent model, when assigning a globally unique ID to the virtual resource and acquire an index of each virtual resource, a 32-bit integer is used as an ID, the lower-12-bit of the integer is used as an index of the sub-model of the composite model, and the remaining higher-20-bit of the integer is used as indexes of the independent model or composite model.

The reason why 12 bit is used as the index of the sub-model is because the largest composite model in the game scene already has several hundred sub-models, and 12 bit can represent 4096 numbers, which is enough for current use and reserves enough space for future larger composite models. The high bit may represent up to $2^{19}$, and the independent models or composite models in the game scene are tens of thousands. In addition, since the index of the sub-model in the composite model starts from 0, an offset of 1 is added for this, so that when the index of the sub-model is 0, it indicates that the virtual resource is an independent model.

For example, if two horizontal plane virtual resources and four vertical plane virtual resources may be spliced together to form a house which belongs to a composite model, the IDs of the two horizontal plane virtual resources are:

0000 0000 0000 0000 0000 0001: 0000 0000 0001;
0000 0000 0000 0000 0000 0001: 0000 0000 0002;

The IDs of the four vertical plane virtual resources are:
0000 0000 0000 0000 0001: 0000 0000 0003;
0000 0000 0000 0000 0001: 0000 0000 0004;
0000 0000 0000 0000 0001: 0000 0000 0005;
0000 0000 0000 0000 0001: 0000 0000 0006;

The ID of one independent horizontal plane virtual resource is:
0000 0000 0000 0000 0002: 0000 0000 0000.

According to the low-bit information of the virtual resource ID, the virtual resource may be quickly identified as an independent model or a sub-model in the composite model. For example, when the low-bit information is 0000 0000 0000, the virtual resource is identified as an independent model, and when the low-bit information is a numerical offset such as 0000 0000 0001, the virtual resource is identified as a composite model. Meanwhile, according to the high-bit information of the virtual resource ID, all the sub-models in the composite model may be quickly identified, for example, the virtual resource ID with the high-bit information of 0000 0000 0000 0000 0001 belongs to a sub-model in a same composite model.

Through the above implementation manner, the convenience of the client to access the storage structure of removed data is improved, so that the client can quickly locate which virtual resources are in the region when synchronizing the virtual resource state information of a certain region.

In an optional implementation manner, the virtual resource state index table further includes: virtual resource shape information corresponding to each virtual resource, where the virtual resource shape information is one of the following: a horizontal plane, a vertical plane, an upward slope, and a downward slope.

In an optional implementation manner, the virtual resource state index table further includes: virtual resource classification information corresponding to each virtual resource, where the virtual resource classification information is one of the following: an existing virtual resource and a newly created virtual resource.

The newly created virtual resource generated by rendering in a game picture is triggered to be constructed by a player's construction instruction, where the construction instruction includes at least a space type of a virtual resource (i.e., newly created resource) intended to be constructed by the player, and the construction instruction may also include the material attributes (such as wood, concrete or bricks) and quantity of the newly created resources. The existing virtual resource is a virtual resource initially set by a game developer for the game scene. The shape of the existing virtual resource may be the same as or different from the shape of the newly-created virtual resource. For example, the shape information of the newly-created virtual resource includes: a horizontal plane, a vertical plane, an upward slope, and a downward slope. The shape information of the existing virtual resource includes: a horizontal plane, a vertical plane, a pillar, and an irregular type.

In an optional implementation manner, the space of the game scene is divided into multiple geometries spliced with each other, the virtual resource is built on a surface of one geometry or an inner section of one geometry, and the region in the game scene is composed of at least one geometry.

The space of the game scene is divided into multiple geometries spliced with each other. The geometry may be a cuboid, a cube, a parallelepiped, a honeycomb, etc. It can be understood that the geometries may be spliced together to form a space for the entire game scene. It should be noted that the geometry into which the space of the game scene is divided is a logical space, for example, a range of space in which x, y, and z coordinates are in the range of 0 to 50.

The region divided in the game scene is a two-dimensional region divided on x and z axes (horizontal direction), each divided region is composed of at least one of the geometries, and the divided region is usually an integer multiple of the geometry. It should be noted that the geometry itself is a three-dimensional region, and each of the divided regions described herein is composed of at least one of the geometries, that is, on the premise that the y axis (vertical direction,) is not considered, and only the plane (horizontal direction) determined by x and z axes is considered, each divided region is composed of at least one of the geometries.

In an optional implementation manner, the geometry is a rectangular with the same length and width. A coordinate system XYZ is established in the space of the game scene, which is horizontal XZ coordinates and a vertical upward coordinate Y, respectively. The way of spatial division refers to dividing the space into an infinite number of cuboids with intervals of X=5 m, Z=5 m and vertical upward Y=3.5 m. It should be noted that the length, width, and height indexes of the cuboid may be arbitrarily set by the developer according to the actual situation.

In the game scene space divided into multiple geometries spliced with each other, the surface of each geometry and the section inside the geometry may be used to build new virtual resources. Meanwhile, the original building components in the game scene (existing virtual resources) are also pre-placed according to the surface of the geometry and the internal section.

Since the newly-created virtual resource has the same placement rules as the existing virtual resource, it is easier to match the existing virtual resource when generating the new virtual resource, which also greatly reduces the calculation amount and improves the running efficiency of the game.

The following describes an example in which a space is divided into multiple mutually spliced cuboids with the same length and width. It should be noted that dividing a space into a plurality of mutually spliceable geometries of any shape is included in the protection scope of the present disclosure.

The shape information of the virtual resource may be: a horizontal plane, a vertical plane, an upward slope, and a downward slope, that is, a geometric position relative to the cuboid, which may be constructed along a vertical plane of the cuboid, constructed along a horizontal plane of the cuboid, or constructed along an inner slope of the cuboid. The vertical plane, that is, the four planes in the cuboid perpendicular to the ground plane of the game scene, the horizontal plane is two planes parallel to the ground plane of the game scene in the cuboid, and the inner slope is a diagonal section in the cuboid, and the plane of the diagonal section passes through the two sides of the horizontal plane of the cuboid and intersects the two vertical planes of the cuboid. Taking the material property of the virtual resource as a brick, for example, the virtual resource constructed along the vertical plane of the cuboid is a vertical wall, the virtual resource constructed along the horizontal plane of the cuboid is a horizontal wall, and the virtual resource constructed along the inner slope of the cuboid is an upward or downward slope.

Through the above implementation manner, the game scene is geometrically normalized, so that the newly created virtual resources and the existing virtual resources in the game scene can be aligned and spliced to enhance the attractiveness of a picture; meanwhile, the virtual resources are prevented from physical collision detection during the construction in the game scene, thereby effectively reducing system overheads and improving the smooth running of the game.

In an optional implementation manner, the virtual resource state index table further includes: geometry index information corresponding to each virtual resource, where the geometry index information is used to identify a mapping relationship between the geometry and the virtual resource.

During the initialization process of a game, the server acquires, from a game scene file, the IDs of all virtual resources, the model information of a virtual resource, world coordinate information, and rotation information, wherein the virtual resource may be a sub-model in a composite model, or an independent model. Meanwhile, a gim file of the composite model in the game scene is parsed, the rotation, scaling and position information of each sub-model in a local coordinate system of the composite model is acquired, a gim file path of each sub-model is acquired, the gim file of the sub-model is parsed, and bounding box information of each sub-model is acquired.

Then, the virtual resources in the game scene are reconstructed in three dimensions, the geometry of each virtual resource is determined, and a mapping relationship between the virtual resource and the geometry is established. The purpose of 3D reconstruction is to provide information for the gridded construction of virtual resources, to determine places for constructing virtual resources and places not for constructing virtual resources in the game scene.

FIG. 2 is a schematic diagram of three-dimensional reconstruction mapping relationship virtual resources in one of the exemplary embodiments of the present disclosure. When the virtual resources in the game scene are reconstructed in three dimensions, the sub-model of the composite model may be mapped into the following types:

1. Vertical plane (including two types westward and southward)
2. Horizontal plane
3. Irregular type (sub-model, mainly roof or stair)
4. Pillar As shown in FIG. 2, after abstracting the building on the left in FIG. 2 and performing three-dimensional reconstruction, the composite model on the right side of FIG. 2 is obtained. Assuming that the coordinates of the composite model in FIG. 2 in the geometry are (x, y, z), the abstracted composite model is used to describe the original building as shown in the following table:

| Sub-model (virtual resource) | Mapping type | Geometry coordinate |
| --- | --- | --- |
| oD | Pillar | (x, y, z) |
| AE | Pillar | (x + 1, y, z) |
| BF | Pillar | (x + 1, y, z + 1) |
| CG | Pillar | (x, y, z + 1) |
| oAED | Vertical plane southward | (x, y, z) |
| ABFE | Vertical plane westward | (x + 1, y, z) |
| BCGF | Vertical plane southward | (x, y, z + 1) |
| CoDF | Vertical plane westward | (x, y, z) |
| oABC | Horizontal plane | (x, y, z) |
| DEFG | Horizontal plane | (x, y + 1, z) |
| DEFGLM | Irregular type | (x, y + 1, z) |

After the above three-dimensional reconstruction, the mapping relationship between the virtual resource and the geometry is established, so that when the virtual character is constructed or disassembled in the game scene, the type of the virtual resource existing in each geometry can be judged according to the virtual resource state index table, the position where the virtual resource can be constructed can be determined, and the geometry where the virtual resource is located can also be quickly indexed according to the virtual resource state index value.

In an optional implementation manner, the virtual resource state index table further includes: regional index information corresponding to each virtual resource, where the regional index information is used to identify a mapping relationship between the region and the virtual resource.

The regional index information corresponding to each virtual resource is used to identify the mapping relationship between each virtual resource and the region. The convenience of the client to access the storage structure of removed data is improved, so that the client can quickly determine the region where the virtual resource to be removed is located, and can quickly locate which virtual resources are in the region when synchronizing the virtual resource state information of a certain region.

Through the above implementation manner, the convenience of the client to access the storage structure of removed data is improved, so that the client can quickly locate which virtual resources are in the region when synchronizing the virtual resource state information of a certain region. The geometry, classification information, shape information and other information of the virtual resource are further quickly determined. Meanwhile, through the virtual resource state index table, the entire game scene does not need to be loaded into a memory, and only the geometry where the virtual resources exist in the region is loaded into the memory. This greatly saves the memory consumption.

In an optional implementation manner, the virtual resource state index table adopts an index storage manner. FIG. 3 is a schematic diagram of a virtual resource state index table in one exemplary embodiment of the present disclosure. As shown in FIG. 3, a primary index is a region index, a secondary index is a geometry index, a tertiary index is a virtual resource classification information index, and a quaternary index is a virtual resource shape information index. After a certain virtual resource in the game scene is removed, the virtual resource is removed in the virtual resource state index table, or the state information of the virtual resource is changed to a removed state. In the above manner, when the client attempts to construct a new virtual resource at an original position or an adjacent position of the removed virtual resource, the corresponding information can be queried from the virtual resource state index table timely and quickly.

In an implementation manner, at step S130, the virtual resource to be removed is removed from the region in the game scene, and regional virtual resource state information corresponding to the region is generated, and the method further includes the following steps.

At step S1307, virtual resource state information in the region is acquired from the virtual resource state index table, according to the region where virtual character is located.

At step S1308, the virtual resource to be removed is removed from the region in the game scene, the virtual resource state information in the region is updated, and regional virtual resource state information corresponding to the region is generated.

The server may use the virtual resource state index table established by itself to maintain the state information of virtual resources existing in the game scene. After determining the region where the virtual character is located according to the current position of the virtual character in the game scene, the locally maintained virtual resource state index table is read, and the virtual resource state information in the region is indexed from the virtual resource state index table, according to the region where virtual character is located. After the virtual resource to be removed is removed, the virtual resource state index table is updated in real time, only the state-changed virtual resource state information may be updated, or all virtual resource state information in the region may be updated together to ensure that the virtual resource state index table may correctly reflect the latest state of each virtual resource in the game scene, and meanwhile, the regional virtual resource state information corresponding to the region is generated according to the latest virtual resource state index table.

Through the above implementation manner, the server uses a region index to quickly update and generate virtual resource state information of the corresponding region, improve the efficiency of information processing, and effectively reduce the resource consumption.

Figure 4:
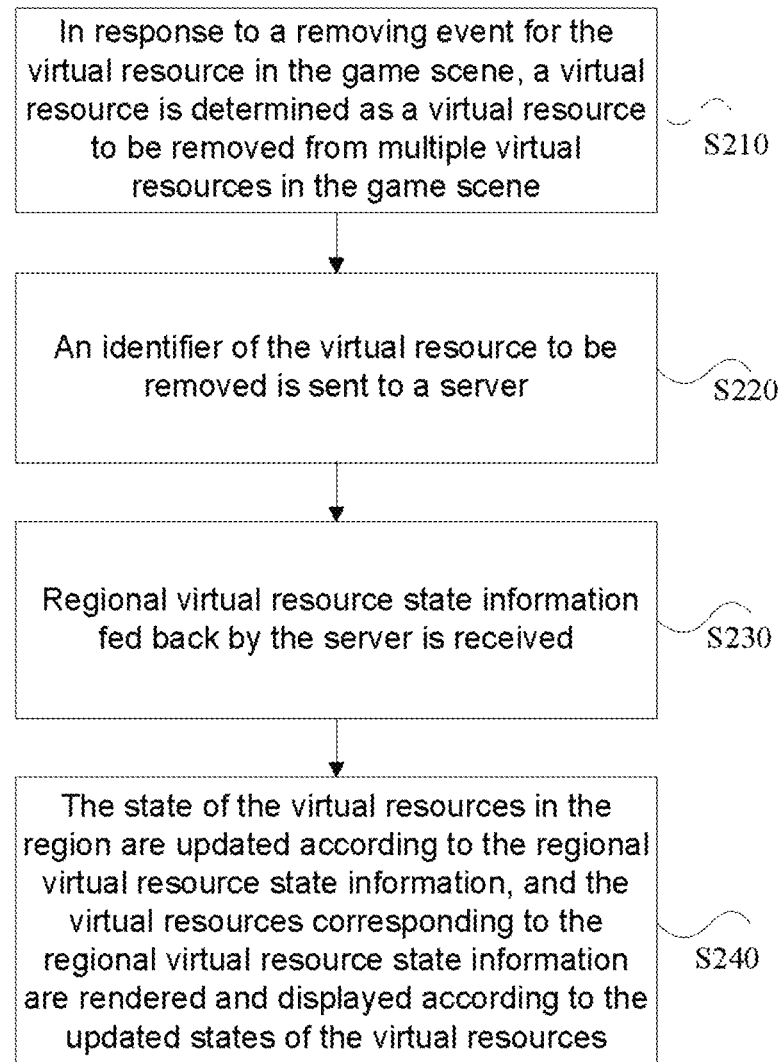
FIG. 4 is a flowchart of a processing method for a virtual resource in a game scene according to an embodiment of the present disclosure.

The embodiment of the present disclosure also provides a processing method for a virtual resource in a game scene. An execution entity of the method is a client, and the client may be any client device such as a computer, a mobile phone, a tablet computer, a mobile terminal, or an electronic device. FIG. 4 is a flowchart of a processing method for a virtual resource in a game scene according to an embodiment of the present disclosure. As shown in FIG. 4, in the present embodiment, the method includes the following steps.

At step S210, in response to a removing event of the virtual resource in the game scene, a virtual resource is determined as a virtual resource to be removed from multiple virtual resources in the game scene.

At step S220, an identifier of the virtual resource to be removed is sent to a server.

At step S230, regional virtual resource state information returned from the server is received, the regional virtual resource state information being virtual resource state information in a region where the virtual character is located, which is determined by the server according to a current position of the virtual character.

At step S240, the state of the virtual resource in the region is updated according to the regional virtual resource state information, and the virtual resource corresponding to the regional virtual resource state information is rendered and displayed according to the updated state of the virtual resource.

Through the above implementation manner, according to a current position of a virtual character in a game scene, a region where the virtual character is located is determined, corresponding virtual resources are loaded in the game scene according to the range of the region, and the state of the virtual resources in the game scene is updated in a unit of region, which effectively reduces resource consumption and can greatly reduce the pressure of data processing.

Each step of the processing method for a virtual resource in a game scene in the present exemplary embodiment will be further described below.

In the present exemplary embodiment, a software application is executed on a processor of a client device, a graphical user interface is obtained by rendering on a display of the client device, the content displayed by the graphical user interface at least partially includes a local or global game scene, and the game scene includes at least one virtual character.

The content presented by the graphical user interface may include the game scene globally or locally. For example, when the game scene is relatively large, the local content of the game scene is displayed on the graphical user interface of a mobile terminal during the game. The game scene may be a square or other shapes, such as a circle, and the like. The game scene may include ground, mountains, rocks, flowers, grass, trees, buildings, and the like.

The game scene includes at least one virtual resource, which may be a construct built in the game scene, such as a house, a horizontal plane, a vertical plane, a slope, a table, a chair, a street lamp, and the like. The virtual resources may be presented by the graphical user interface. The presented content may include the virtual resource globally or locally.

The game scene includes at least one virtual character and may be presented by the graphical user interface. The presented content may include the virtual character globally or locally. For example, in a third person perspective game, the content presented by the graphical user interface may include the entire part of the virtual character. For another example, in a first person perspective game, the content presented by the graphical user interface may include part of the virtual character.

The virtual character may be a virtual character of an enemy camp, or may be a virtual character of an own camp. The virtual character may perform corresponding actions in the game scene in response to an operation of a user. For example, the user may control the virtual character to walk, run, squat, bend, attack, shoot, etc. in the game scene. The present invention is not limited herein.

In an optional implementation manner, at step S210, in response to a removing event of the virtual resource in the game scene, a virtual resource is determined as a virtual resource to be removed from multiple virtual resources in the game scene.

The removing event of the virtual resource in the game scene may be triggered by detecting a touch operation of a specific trigger control provided in a user graphical interface; or may be triggered according to a preset interaction condition, for example, pressing, shaking, voice input, special gestures of users, etc.; may also be triggered by detecting whether the virtual resources in the game scene are attacked. For example, when it is detected that the virtual resource A is collided by bullets or props, the removing event is triggered. It may also be triggered by detecting the remaining blood volume of the virtual resource in the game scene to be 0.

It should be noted that the removing event is triggered by detecting whether the virtual resource in the game scene is attacked, where the attack may be multiple attacks from the same virtual character or different virtual characters, so it may be set that the removing event may be triggered every time the virtual resource is attacked. It may also be set that the removing event is triggered when the virtual resource is attacked by each of different virtual characters for the first time, a preset time or a certain time.

It should be noted that the removing event is triggered by In response to that the remaining blood volume of the virtual resource in the game scene is 0, where the virtual resource has an initial blood amount of a preset value, and when attacked, a certain amount of blood is lost according to the attack type. The removing event is triggered when In response to that the remaining blood volume of the virtual resource in the game scene is 0.

A virtual resource is determined as a virtual resource to be removed from multiple virtual resources in the game scene. For example, when it is detected that the virtual resource A is collided by bullets or props, the removing event is triggered, the virtual resource A is determined as the virtual resource to be removed, and an identifier of the virtual resource A is acquired.

In an optional implementation manner, a name-ID mapping table is maintained on the client side, the table stores the names of all virtual resources in the game scene and the ID assigned to the virtual resources, and a mapping relationship between names and IDs is given in the table. When a removing event is detected on the client, the name of the virtual resource to be removed is acquired, the ID corresponding to the virtual resource is acquired from the name-ID mapping table according to the name of the virtual resource, and the ID of the virtual resource is mainly used for communication between the client and the server. This is because when the virtual resource is used to communicate with a unique name in the scene, the name is usually very long and the player traffic is wasted, so a 4-bit integer is used to uniquely identify the virtual resource for communication.

In an optional implementation manner, the step of responding to a removing event of the virtual resource in the game scene includes that: a physical button of the client is associated with a removing instruction, and when the mobile terminal detects that the physical button is pressed, the virtual character is controlled to remove the virtual resource in the game scene. In other implementation manners, the virtual character is controlled to remove the virtual resource by a preset audio instruction.

In an optional implementation manner, at step S220, an identifier of the virtual resource to be removed is sent to a server.

The client sends an identifier of the virtual resource to the server. After receiving the virtual resource identifier sent by the client, the server locally queries and acquires the virtual resource corresponding to the identifier according to the virtual resource identifier.

The identifier of the virtual resource to be removed may be sent to the server by using a wired or wireless manner. The communication protocol used is in the conventional art and is not described here.

In an optional implementation manner, at step S230, regional virtual resource state information returned from the server is received, the regional virtual resource state information being virtual resource state information in a region where the virtual character is located, which is determined by the server according to a current position of the virtual character.

According to a current position of a virtual character in a game scene, the server determines a region where the virtual character is located. The region may be a circular range region in the game scene centered on a position where the virtual character is located, and a radius of a preset distance, may be a region with any shape, including the current position where the virtual character is located, and may also be obtained by dividing the game scene into multiple regions in advance, and determining a preset region to which the current position of the virtual character in the game scene belongs.

The server maintains the state information of all the virtual resources existing in the game scene. After determining a virtual resource to be removed according to the identifier of the virtual resource to be removed, the virtual resource to be removed may be directly deleted from the region determined according to the current position of the virtual character in the game scene, or the virtual resource to be removed is removed from the region determined according to the current position of the virtual character in the game scene when it is detected that the virtual resource to be removed meets a preset condition, and regional virtual resource state information corresponding to the region is generated, where the regional virtual resource state information may include current state information of all virtual resources in the corresponding region, including: whether it is removed, the material of the virtual resource, the remaining blood volume, and the like; or, the regional virtual resource state information may include current state information of all the virtual resources in the corresponding area, including: the material of the virtual resource, the remaining blood volume, and the like; or, the regional virtual resource state information may include current state information of the state-changed virtual resources in the corresponding region. The client receives the above regional virtual resource state information returned from the server.

For example, virtual resources A, B, C, and D exist in the region, which is set to be the region Z and determined according to the current position of the virtual character. When it is determined that the virtual resource to be removed is the virtual resource A, the virtual resource is removed from the region Z in the game scene, that is, the virtual resources B, C and D exist in the region Z currently after deletion. Meanwhile, regional virtual resource state information corresponding to the region Z is generated, and the information may include the following content: virtual resource A: removed; virtual resource B: normal; virtual resource C: normal; virtual resource D: normal; or, the information may include the following content: virtual resource B: normal; virtual resource C: normal; virtual resource D: normal; or, the information may include the following content: virtual resource A: removed. The client receives the above regional virtual resource state information returned from the server.

In an optional implementation manner, when the server detects that the virtual resource to be removed meets the preset condition, the virtual resource to be removed is removed from the region in the game scene. The preset condition may be preset by a developer according to the actual situation. When the server detects that the virtual resource to be removed meets the preset condition, the virtual resource to be removed is removed from the region in the game scene. For example, when the server detects that the current remaining blood volume of the virtual resource to be removed is 0, the virtual resource to be removed is removed from the region in the game scene. For example, when the server detects that the virtual resource to be removed is attacked by a specific attack mode, such as the virtual character is in a direct removing mode or the virtual resource to be removed is attacked by a removing weapon, the virtual resource to be removed is removed from the region in the game scene, etc.

For example, the virtual resources A, B, C, and D exist in the region, which is set to be the region Z and determined according to the current position of the virtual character, such as: virtual resource A: normal, remaining blood volume 60%; virtual resource B: normal, remaining blood volume 100%; virtual resource C, remaining blood volume 100%: normal; virtual resource D, remaining blood volume 100%. When it is determined that the virtual resource to be removed is the virtual resource A, it is detected whether the remaining blood volume of the virtual resource A is 0, and when the remaining blood volume of the virtual resource A is 0, the virtual resource is removed from the region Z in the game scene, that is, the virtual resources B, C and D exist in the region Z currently after deletion. Meanwhile, regional virtual resource state information corresponding to the region Z is generated, and the information may include the following content: virtual resource A: removed; virtual resource B: normal, remaining blood volume 100%; virtual resource C, remaining blood volume 100%: normal; virtual resource D, remaining blood volume 100%; or, the information may include the following content: virtual resource B: normal, remaining blood volume 100%; virtual resource C, remaining blood volume 100%: normal; virtual resource D, remaining blood volume 100%; or, the information may include the following content: virtual resource A: removed. The client receives the above regional virtual resource state information returned from the server.

For example, virtual resources A, B, C, and D exist in the region, which is set to be the region Z and determined according to the current position of the virtual character. When an identifier of a virtual resource to be removed is received and it is determined that the virtual resource to be removed is the virtual resource A, when it is detected that the virtual resource A is attacked by a removing weapon, such a hoe, a hammer, and the like, or when it is detected that the virtual character is in a direct removing mode, the virtual resource is removed from the region Z in the game scene, that is, the virtual resources B, C and D exist in the region Z currently after deletion. Meanwhile, regional virtual resource state information corresponding to the region Z is generated, and the information may include the following content: virtual resource A: removed; virtual resource B: normal; virtual resource C: normal; virtual resource D: normal; or, the information may include the following content: virtual resource B: normal; virtual resource C: normal; virtual resource D: normal; or, the information may include the following content: virtual resource A: removed. The client receives the above regional virtual resource state information returned from the server.

In an optional implementation manner, at step S240, the state of the virtual resources in the region are updated according to the regional virtual resource state information, and the virtual resources corresponding to the regional virtual resource state information are rendered and displayed according to the updated state of the virtual resource.

The client updates the state of the virtual resources in the region according to the regional virtual resource state information, and renders and displays the virtual resources corresponding to the regional virtual resource state information on the graphical user interface of the client according to the updated state of the virtual resource. The client saves the state information of the virtual resource in the region, or saves the state information of all the virtual resources in the game scene, and the format and data structure of the stored information may be arbitrarily set as needed. The client updates the state information of the locally saved virtual resource according to the received regional virtual resource state information, thereby completing the update of the state of the virtual resource in the region.

For example, the state of the virtual resource in the region Z saved locally by the client a is: virtual resource A: normal; virtual resource B: normal; virtual resource C: normal; virtual resource D: normal; the server sends the regional virtual resource state information to the client a, the regional virtual resource state information being: virtual resource A: removed; virtual resource B: normal; virtual resource C: normal; virtual resource D: normal; or the regional virtual resource state information being: virtual resource B: normal; virtual resource C: normal; virtual resource D: normal; or the regional virtual resource state information being: virtual resource A: removed. The client a updates the state of the virtual resources in the region according to the regional virtual resource state information, that is, the state of the virtual resource A is changed from normal to removed, and a removing animation of the virtual resource A is rendered and displayed in a graphical user interface of a client A.

In an optional implementation manner, the virtual resource corresponding to the regional virtual resource state information is rendered and displayed according to the updated state of the virtual resource, where the state of the virtual resource is determined by virtual resource state information, and the virtual resource state information includes the current state of the virtual resource, such as: whether it is removed, the material of the virtual resource, the remaining blood volume, and so on.

For example, the virtual resource state information of the virtual resource A is: virtual resource A: normal, the normal state of the virtual resource is rendered and displayed in the graphical user interface of the client; if the virtual resource state information of the virtual resource A is: virtual resource A: removed, the virtual resource is hidden or deleted after the removing animation of the virtual resource is rendered and displayed in the graphical user interface of the client; if the virtual resource state information of the virtual resource A is: virtual resource A: remaining blood volume 20%, the virtual resource is rendered and displayed in the graphical user interface of the client, and a display effect such as a crack or a gap is added to the virtual resource.

Through the above implementation manner, according to a current position of a virtual character in a game scene, a region where the virtual character is located is determined, corresponding virtual resources are loaded in the game scene according to the range of the region, and the state of the virtual resource in the game scene is updated in a unit of region, which effectively reduces resource consumption and can greatly reduce the pressure of data processing.

In an optional implementation manner, after step S240, the method further includes the following steps.

At step S2401, the state of a virtual resource to be removed in the region and the state of an adjacent virtual resource of the virtual resource to be removed are updated according to the regional virtual resource state information, and the virtual resources in the region are rendered and displayed according to the updated state of the virtual resources in the region.

The received regional virtual resource state information returned from the server includes the state information of the virtual resource to be removed, and the method further includes state information of an adjacent virtual resource to be removed adjacent to the virtual resource to be removed. The server determines adjacent virtual resources that have an adjacent relationship with the virtual resource to be removed, acquires an adjacent relationship table of the adjacent virtual resources, deletes the virtual resource to be removed from the adjacent relationship table, determines, according to the adjacent relationship table, whether the adjacent virtual resources are connected to the ground, deletes, if the adjacent virtual resources cannot be connected to the ground, the adjacent virtual resources from the region in the game scene, and generates regional virtual resource state information according to the current state of the virtual resources in the region.

The adjacent virtual resources adjacent to the virtual resource to be removed are determined. The adjacent virtual resources may be directly adjacent to the virtual resource to be removed, or may be indirectly adjacent to the virtual resource to be removed. That is, the adjacent relationship includes a direct adjacent relationship and an indirect adjacent relationship. The direct adjacent relationship means that two virtual resources have a common edge, or one face of one virtual resource is connected to the surface of another virtual resource, or one point of one virtual resource is connected to the surface of another virtual resource. For example, the virtual resource A is a horizontal plane, and the virtual resource B is also a horizontal plane. When the virtual resource A and the virtual resource B are juxtaposed together and the sides of the two horizontal planes are attached together, the two horizontal planes are considered to be directly adjacent. In other words, the virtual resource C is a vertical plane. When the side of the virtual resource A and the front side of the virtual resource C are combined to form a vertical wall and ground or a vertical wall and top surface of the house, the virtual resource A and the virtual resource C are considered to be directly adjacent. The indirect adjacent relationship means that two virtual resources have the same virtual resource with direct adjacent relationship. For example, the virtual resource A is a horizontal plane, the virtual resource B is also a horizontal plane, a virtual resource D in the direction of a horizontal plane exists between the virtual resource A and the virtual resource B, the two sides of the virtual resource D are directly adjacent to the virtual resource A and the virtual resource B, respectively, and then it is considered that there is an indirect adjacent relationship between the virtual resource A and the virtual resource B.

The server maintains an adjacent relationship table for each virtual resource in the game scene. The adjacent relationship table records an identifier of adjacent virtual resources corresponding to each virtual resource and currently adjacent to the virtual resource in real time. When a certain virtual resource in the game scene is determined to be the virtual resource to be removed, adjacent virtual resources of the virtual resource are determined, an adjacent relationship table of the adjacent virtual resources is obtained, and the virtual resource to be removed is removed from the adjacent relationship table.

The client updates the state of the virtual resources in the region according to the regional virtual resource state information, and renders and displays the virtual resources corresponding to the regional virtual resource state information on the graphical user interface of the client according to the updated state of the virtual resources.

By the above implementation manner, after a virtual resource to be removed is determined, other virtual resources to be removed that meet the conditions are automatically determined according to a preset adjacent relationship, thereby reducing the occupation of system data processing resources. Based on this manner, after the user removes the virtual resource to be removed, other adjacent virtual resources to be removed, which meet conditions, are removed jointly, thereby achieving the effect of conforming to building collapse in the real world, and improving the game experience of the user.

In an optional implementation manner, before responding to a removing event of the virtual resource in the game scene at step S210, the method further includes the following steps.

At step S250, a current position of the virtual character in the game scene is acquired, and a virtual resource state index table is acquired locally.

At step S260, the virtual resources in the game scene are rendered and loaded according to the current position of the virtual character in the game scene and the virtual resource state index table.

According to a touch operation of a user on the client, the moving direction of the virtual character in the game scene may be changed, thereby controlling the virtual character to move freely in the game scene, and changing the position of the virtual character in the game scene. Acquiring the current position of the virtual character in the game scene may be acquiring coordinates of the virtual character in the game scene, or other values capable which can characterize the position of the virtual character in the game scene.

In an optional implementation manner, a moving controller is provided in the graphical user interface, and the virtual character is configured to move in the first game scene according to the touch operation received by the moving controller. The moving controller may be, for example, a virtual joystick, a direction control virtual button, etc., which is not specifically limited in the present exemplary embodiment.

Specifically, the touch operation applied to the moving controller is detected, and the virtual character is controlled to move in the game scene according to the movement of a touch point of the touch operation.

In an optional implementation manner, the moving controller is a virtual joystick that controls the virtual character to move in the game scene according to the touch operation received by the virtual joystick.

In an optional implementation manner, the moving controller is a virtual cross key/virtual direction key, such as a D-PAD, that controls the virtual character to move in the game scene according to the touch operation received by the virtual cross key.

The virtual resource state index table is a multi-level indexed storage data structure for storing state information of all virtual resources in the game scene. During the initialization process of the game, the client receives the virtual resource state index table corresponding to each virtual resource in the game scene from the server and stores it locally. During the running process of the game, the client acquires the virtual resource state index table locally. The virtual resources in the game scene are rendered and loaded according to the current position of the virtual character in the game scene and the virtual resource state index table.

It should be noted that, according to the current position of the virtual character in the game scene and the virtual resource state index table, the virtual resources in the entire game scene may be rendered and loaded, or only the virtual resources in a partial region of the game scene may be rendered and loaded according to the current position of the virtual character in the game scene.

The convenience of the client to access the storage structure of removed data can be improved by the virtual resource state index table, so that the server may quickly index the state information of each construction model through the index table, thereby improving the efficiency of information processing, and effectively reducing the resource consumption.

In an optional implementation manner, the virtual resource state index table further includes: virtual resource identifier corresponding to each virtual resource and virtual resource state information of each virtual resource. The client can quickly locate which virtual resources are in the region when synchronizing the virtual resource state information of a certain region, and can quickly acquire the state information of the corresponding virtual resource according to the virtual resource identifier.

In an optional implementation manner, the game scene includes composite models composed of at least two virtual resources, where high-bit information in the virtual resource identifier is used to identify the composite model, and low-bit information in the identifier is used to identify the virtual resources constituting the composite model.

The multiple virtual resources in the game scene may be spliced together to form a composite model. For example, two horizontal plane virtual resources and four vertical plane virtual resources may be spliced together to form a house, and the house is a composite model.

In an optional implementation manner, in order to identify that the virtual resource in the game scene is a sub-model in the composite model, or an independent model, and acquire an index of each virtual resource, when assigning a globally unique ID to the virtual resource, a 32-bit integer is used as an ID, the lower 12 bits of the integer are used as indexes for the sub-model of the composite model, and the remaining 20 higher bits are used as indexes for the independent model or composite model.

The reason why 12 bit is used as the index of the sub-model is because the largest composite model in the game scene already has several hundred sub-models, and 12 bit can represent 4096 numbers, which is enough for current use and reserves enough space for future larger composite models. The high bit may represent up to 2^19, and the independent models/composites model in the game scene are only tens of thousands. In addition, since the index of the sub-model in the composite model starts from 0, an offset of 1 is added for this, so that when the index of the sub-model is 0, it indicates that the virtual resource is an independent model.

For example, if two horizontal plane virtual resources and four vertical plane virtual resources may be spliced together to form a house which belongs to a composite model, the IDs of the two horizontal plane virtual resources are:
0000 0000 0000 0000 0000 0001: 0000 0000 0001;
0000 0000 0000 0000 0000 0001: 0000 0000 0002;
The IDs of the four vertical plane virtual resources are:
0000 0000 0000 0000 0001: 0000 0000 0003;
0000 0000 0000 0000 0001: 0000 0000 0004;
0000 0000 0000 0000 0001: 0000 0000 0005;
0000 0000 0000 0000 0001: 0000 0000 0006;
The ID of one independent horizontal plane virtual resource is:
0000 0000 0000 0000 0002: 0000 0000 0000.

According to the low-bit information of the virtual resource ID, the virtual resource may be quickly identified as an independent model or a sub-model in the composite model. For example, when the low-bit information is 0000 0000 0000, the virtual resource is identified as an independent model, and when the low-bit information is a numerical offset such as 0000 0000 0001, the virtual resource is identified as a composite model. Meanwhile, according to the high-bit information of the virtual resource ID, all the sub-models in the composite model may be quickly identified, for example, the virtual resource ID with the high-bit information of 0000 0000 0000 0000 0001 belongs to a sub-model in a same composite model.

Through the above implementation manner, the convenience of the client to access the storage structure of removed data is improved, so that the client can quickly locate which virtual resources are in the region when synchronizing the virtual resource state information of a certain region.

In an optional implementation manner, the virtual resource state index table further includes: virtual resource shape information corresponding to each virtual resource, where the virtual resource shape information is one of: a horizontal plane, a vertical plane, an upward slope, and a downward slope.

In an optional implementation manner, the virtual resource state index table further includes: virtual resource classification information corresponding to each virtual resource, where the virtual resource classification information is one of: an existing virtual resource and a new virtual resource.

The newly created virtual resource generated by rendering in a game picture is triggered to be constructed by a player's construction instruction, where the construction instruction includes at least a space type of a virtual resource (i.e., newly created resource) intended to be constructed by the player, and the construction instruction may also include the material attributes (such as wood, concrete or bricks) and quantity of the newly created resources. The existing virtual resource is a virtual resource initially set by a game developer for the game scene. The shape of the existing virtual resource may be the same as or different from the shape of the newly created virtual resource. For example, the shape information of the newly created virtual resource includes: a horizontal plane, a vertical plane, an upward slope, and a downward slope. The shape information of the existing virtual resource includes: a horizontal plane, a vertical plane, a pillar, and an irregular type.

In an optional implementation manner, the space of the game scene is divided into multiple geometries spliced with each other, the virtual resource is built on a surface of one geometry or an inner section of one geometry, and the region in the game scene is composed of at least one geometry.

The space of the game scene is divided into multiple geometries spliced with each other. The geometry may be a cuboid, a cube, a parallelepiped, a honeycomb, etc. It can be understood that the geometries may be spliced together to form a space for the entire game scene. It should be noted that the geometry into which the space of the game scene is divided is a logical space, for example, a range of space in which x, y, and z coordinates are in the range of 0 to 50.

The region divided in the game scene is a two-dimensional region divided on x and z axes (horizontal direction), each divided region is composed of at least one of the geometries, and the divided region is usually an integer multiple of the geometry. It should be noted that the geometry itself is a three-dimensional region, and each of the divided regions described herein is composed of at least one of the geometries, that is, on the premise that the y axis (vertical direction) is not considered, and only the plane (horizontal direction) determined by x and z axes is considered, each divided region is composed of at least one of the geometries.

In an optional implementation manner, the geometry is a cuboid of the same length and width. A coordinate system XYZ is established in the space of the game scene, which is horizontal XZ coordinates and a vertical upward coordinate Y, respectively. The way of spatial division refers to dividing the space into an infinite number of cuboids with intervals of X=5 m, Z=5 m and vertical upward Y=3.5 m. It should be noted that the length, width, and height indexes of the cuboid may be arbitrarily set by the developer according to the actual situation.

In the game scene space divided into multiple spliced geometries spliced with each other, the surface of each geometry and the section inside the geometry may be used to build new virtual resources. Meanwhile, the original building components in the game scene (existing virtual resources) are also pre-placed according to the surface of the geometry and the internal section.

Since the newly created virtual resource has the same placement rules as the existing virtual resource, it is easier to match the existing virtual resource when generating the new virtual resource, which also greatly reduces the calculation amount and improves the running efficiency of the game.

The following describes an example in which a space is divided into multiple mutually spliced cuboids with the same length and width. It should be noted that dividing a space into a plurality of mutually spliceable geometries of any shape is included in the protection scope of the present disclosure.

The shape information of the virtual resource may be: a horizontal plane, a vertical plane, an upward slope, and a downward slope, that is, a geometric position relative to the cuboid, which may be constructed along a vertical plane of the cuboid, constructed along a horizontal plane of the cuboid, or constructed along an inner slope of the cuboid. The vertical plane, that is, the four planes in the cuboid perpendicular to the ground plane of the game scene, the horizontal plane is two planes parallel to the ground plane of the game scene in the cuboid, and the inner slope is a diagonal section in the cuboid, and the plane of the diagonal section passes through the two sides of the horizontal plane of the cuboid and intersects the two vertical planes of the cuboid. Taking the material property of the virtual resource as a brick, for example, the virtual resource constructed along the vertical plane of the cuboid is a vertical wall, the virtual resource constructed along the horizontal plane of the cuboid is a horizontal wall, and the virtual resource constructed along the inner slope of the cuboid is an upward or downward slope.

Through the above implementation manner, the game scene is geometrically normalized, so that the newly created virtual resources and the existing virtual resources in the game scene can be aligned and spliced to enhance the attractiveness of a picture; meanwhile, the virtual resources are prevented from physical collision detection during the construction in the game scene, thereby effectively reducing system overheads and improving the smooth running of the game.

In an optional implementation manner, the virtual resource state index table further includes: geometry index information corresponding to each virtual resource, where the geometry index information is used to identify a mapping relationship between the geometry and the virtual resource.

According to the geometry index information in the virtual resource state index table, the geometry in which each virtual resource is located, as well as the virtual resources contained in each geometry may be quickly determined.

In an optional implementation manner, as shown in FIG. 2, it is assumed that the composite model on the right side in FIG. 2 has coordinates (x, y, z) in the geometry, wherein, the virtual resource is each sub-model of the composite model. The geometry index information in the resource state index table is shown in the following table:

| Sub-model (virtual resource) | Mapping type | Geometry coordinate |
| --- | --- | --- |
| oD | Pillar | (x, y, z) |
| AE | Pillar | (x + 1, y, z) |
| BF | Pillar | (x + 1, y, z + 1) |
| CG | Pillar | (x, y, z + 1) |
| oAED | Vertical plane southward | (x, y, z) |
| ABFE | Vertical plane westward | (x + 1, y, z) |
| BCGF | Vertical plane southward | (x, y, z + 1) |
| CoDF | Vertical plane westward | (x, y, z) |
| oABC | Horizontal plane | (x, y, z) |
| DEFG | Horizontal plane | (x, y + 1, z) |
| DEFGLM | Irregular type | (x, y + 1, z) |

According to the geometry index information in the resource state index table, it may be determined that the geometry (x, y, z) includes the virtual resources oD, oAED, CoDG, and oABC; the geometry (x+1, y, z) includes the virtual resources AE and ABFE; the geometry (x, y+1, z) includes the virtual resources DEFG and DEFGLM; the geometry (x, y, z+1) includes the virtual resources CG and BCGF; and the geometry (x+1, y, z+1) includes the virtual resource BF. According to the geometry index information in the resource state index table, the geometric coordinates of each virtual resource may also be quickly determined, thereby establishing a mapping relationship between the virtual resource and the geometry. When the virtual character is constructed or disassembled in the game scene, the virtual resource state index table can be used to determine the virtual resource type existing in each geometry, determine a position where the construction is performed, and quickly index the geometry of the virtual resource according to the virtual resource.

In an optional implementation manner, the virtual resource state index table further includes: regional index information corresponding to each virtual resource, where the regional index information is used to identify a mapping relationship between the region and the virtual resource.

The regional index information corresponding to each virtual resource is used to identify the mapping relationship between each virtual resource and the region. The convenience of the client to access the storage structure of removed data is improved, so that the client can quickly determine the region where the virtual resource to be removed is located, and can quickly locate which virtual resources are in the region when synchronizing the virtual resource state information of a certain region.

Through the above implementation manner, the convenience of the client to access the storage structure of removed data is improved, so that the client can quickly locate which virtual resources are in the region when synchronizing the virtual resource state information of a certain region. The geometry, classification information, shape information and other information of the virtual resource are further quickly determined. Meanwhile, through the virtual resource state index table, the entire game scene does not need to be loaded into a memory, and only the geometry where the virtual resources exist in the region is loaded into the memory. This greatly saves the memory consumption.

In an optional implementation manner, the virtual resource state index table adopts an index storage manner. FIG. 3 is a schematic diagram of a virtual resource state index table in one exemplary embodiment of the present disclosure. As shown in FIG. 3, a primary index is a region index, a secondary index is a geometry index, a tertiary index is a virtual resource classification information index, and a quaternary index is a virtual resource shape information index. After a certain virtual resource in the game scene is removed, the virtual resource is removed in the virtual resource state index table, or the state information of the virtual resource is changed to a removed state. In the above manner, when the client attempts to construct a new virtual resource at an original position or an adjacent position of the removed virtual resource, the corresponding information can be queried from the virtual resource state index table timely and quickly.

The virtual resource state index table used by the client buffers the state information of the virtual resources. When the state of the virtual resources change, the states are stored in a data structure of the virtual resource state index table.

When the player leaves the current region and then returns to the region, the state of the virtual resources can be read directly from a buffer, and the state of the virtual resources are represented using a special effect or UI. The buffer to the state of the virtual resources can greatly reduce the traffic consumption of the client for virtual resource state update.

For example, according to FIG. 3, the game scene is divided into four regions, namely, regions W, X, Y, and Z. Each region contains six geometries, which are respectively geometries 1-6, 7-12, 13-18, and 19-24. Each geometry contains two types of classification information: existing virtual resources and newly created virtual resources. The existing virtual resources contain five types of shape information, namely, a horizontal plane, a westward vertical plane, a southward vertical plane, an irregular type, and a pillar. The newly created virtual resources include four types of shape information, namely, a horizontal plane, a vertical plane, an upward slope, and a downward slope. Each type of shape information in the existing virtual resources includes: a virtual resource ID, a maximum blood volume, and a current blood volume. Each type of shape information in the newly created virtual resources includes: a virtual resource ID, a maximum blood volume, a current blood volume, a material ID, and an physical object.

It is assumed that the information of the virtual resource A in the virtual resource state index table is: global ID1, maximum blood volume 100, current blood volume 100, horizontal plane, existing virtual resource, geometry 3, and region Z; the information of the virtual resource B in the virtual resource state index table is: global ID2, maximum blood volume 100, current blood volume 100, 2 (wood ID), physical object 2, vertical plane, newly created virtual resource, geometry 4, and region Z.

When the client receives the regional virtual resource state information corresponding to the region Z returned from the server, it is learned that the virtual resource A in the region Z will be removed according to the received regional virtual resource state information, and the blood volume of the virtual resource 2 will be 40%, the virtual resource state index table is updated according to the regional virtual resource state information, that is, the virtual resource A is removed from the virtual resource state index table, and the state information of the virtual resource B is updated to: global ID2, maximum blood volume 100, current blood volume 40, 2 (wood ID), physical object 2, vertical plane, new virtual resource, geometry 4, and region Z.

In an optional implementation manner, at step S260, the virtual resources in the game scene are rendered and loaded according to the current position of the virtual character in the game scene and the virtual resource state index table, and the method further includes the following steps.

At step S2601, according to a current position of a virtual character in a game scene, a region where the virtual character is located is determined.

At step S2602, virtual resource state information in the region is acquired according to the virtual resource state index table.

At step S2603, the virtual resources in the region of the game scene are rendered and loaded according to the virtual resource state information in the region.

According to a current position of a virtual character in a game scene, a region where the virtual character is located is determined. The region may be a circular range region in the game scene centered on a position where the virtual character is located, and having a preset distance as a radius, or may be a region with any shape, including the current position where the virtual character is located, and may also be obtained by dividing the game scene into multiple regions in advance, and determining a preset region to which the current position of the virtual character in the game scene belongs. The virtual resource state index table is indexed according to the region in which the virtual character is located, all state information of the virtual resources in the region are acquired, and the virtual resources of the region in the game scene are rendered and loaded according to all the virtual resource state information in the region.

Through the above implementation manner, the virtual resources of the region are rendered and loaded according to the virtual resource state index table and the current position of the virtual character, thereby avoiding loading all models of the game scene, and effectively reducing the resource consumption.

For example, according to FIG. 3, the game scene is divided into four regions, namely, regions W, X, Y, and Z. Each region contains six geometries, which are respectively geometries 1-6, 7-12, 13-18, and 19-24. Each geometry contains two types of classification information: existing virtual resources and newly created virtual resources. The existing virtual resources contain five types of shape information, namely, a horizontal plane, a westward vertical plane, a southward vertical plane, an irregular type, and a pillar. The newly created virtual resources include four types of shape information, namely, a horizontal plane, a vertical plane, an upward slope, and a downward slope. Each type of shape information in the existing virtual resource includes: a virtual resource ID, a maximum blood volume, and a current blood volume. Each type of shape information in the newly created virtual resource includes: a virtual resource ID, a maximum blood volume, a current blood volume, a material ID, and an physical object.

It is assumed that the virtual character is in the region Z, the information of the virtual resource A in the virtual resource state index table is: global ID1, maximum blood volume 100, current blood volume 100, horizontal plane, existing virtual resource, geometry 3, and region Z; the information of the virtual resource B in the virtual resource state index table is: global ID2, maximum blood volume 100, current blood volume 100, 2 (wood ID), physical object 2, vertical plane, newly created virtual resource, geometry 4, and region Z.

The client acquires the virtual resource state information in the region Z according to the locally stored virtual resource state index table, that is, the state information of the virtual resources A and B in the virtual resource state index table. According to the state information, the virtual resources A and B in the region Z of the game scene are rendered and loaded in the graphical user interface of the client.

In an optional implementation manner, at step S240, the states of the virtual resources in the region are updated according to the regional virtual resource state information, and the virtual resources corresponding to the regional virtual resource state information are rendered and displayed according to the updated state of the virtual resources. The method further includes the following steps.

At step S2402, the local virtual resource state index table is updated according to the regional virtual resource state information.

At step S2403, the virtual resources are rendered and displayed according to the updated virtual resource state index table.

The client updates the local virtual resource state index table according to the regional virtual resource state information, and renders and displays the virtual resources on the graphical user interface of the client according to the updated virtual resource state index table.

For example, the virtual resource state index table in the region Z saved locally by the client a is:

Virtual resource A: current blood volume 100, region Z;
Virtual resource B: current blood volume 100, region Z;
Virtual resource C: current blood volume 100, region Z;
Virtual resource D: current blood volume 100, region Z.

The client a receives the regional virtual resource state information sent by the server, where the regional virtual resource state information is: virtual resource A: removed; virtual resource B: current blood volume 100; virtual resource C: current blood volume 100; virtual resource D: current blood volume 100; or, the regional virtual resource state information is: virtual resource B: current blood volume 100; virtual resource C: current blood volume 100; virtual resource D: current blood volume 100; or, the regional virtual resource state information is: virtual resource A: removed. The client a updates the virtual resource state index table according to the regional virtual resource state information, and obtains the updated virtual resource state index table as follows:

Virtual resource A: removed, region Z;
Virtual resource B: current blood volume 100, region Z;
Virtual resource C: current blood volume 100, region Z;
Virtual resource D: current blood volume 100, region Z.

A removing animation of the virtual resource A is rendered and displayed on the graphical user interface of the client a according to the updated virtual resource state index table.

Or, the updated virtual resource state index table is obtained as:

Virtual resource B: current blood volume 100, region Z;
Virtual resource C: current blood volume 100, region Z;
Virtual resource D: current blood volume 100, region Z.

Since the updated virtual resource index table does not have the virtual resource A, a removing animation of the virtual resource A is rendered and displayed on the graphical user interface of the client a according to the updated virtual resource state index table.

Through the above implementation manner, the state of the virtual resource in the game scene is updated in a unit of region through the virtual resource state index table, which effectively reduces resource consumption and can greatly reduce the pressure of data processing.

Figure 5:
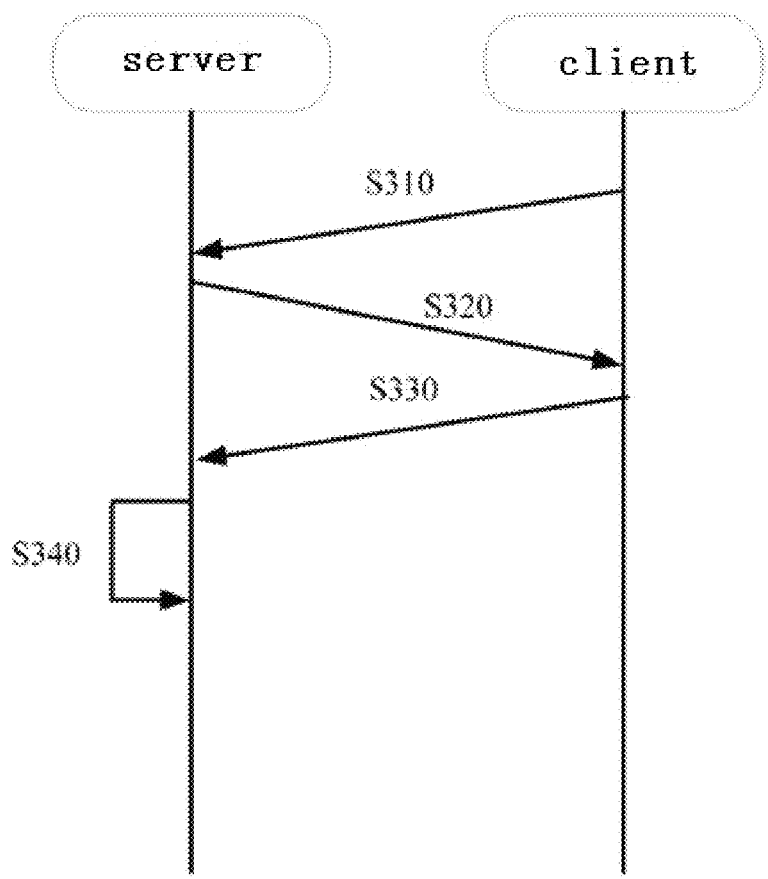
FIG. 5 is a flowchart of a processing method for a virtual resource in a game scene according to an embodiment of the present disclosure.

In an optional implementation manner, FIG. 5 is a flowchart of a processing method for a virtual resource in a game scene according to an embodiment of the present disclosure. As shown in FIG. 5, in the present embodiment, the method includes the following steps:

At step S310, a server performs regional state synchronization to a client.

First, the server maintains a version number for each region in a game scene. This version number will change iteratively every time the state of a model (virtual resource) in the region changes. Meanwhile, the server also maintains the version number of the region through which a game character passes for each game character (virtual character). When the game character enters an unexamined region, if the version number of the region does not match an initial version number, the latest state of the region (regional virtual resource state information) is synchronized to the player. When the game character returns to a region that has passed by, the server compares the version number of the region maintained for the game character with the version number of the region. If they are inconsistent, the server will synchronize the latest state of the region (regional virtual resource state information) to the corresponding client. With each synchronization, the client buffers the synchronized states.

At step S320, the virtual character launches an attack on the model in the game scene.

When the game character (virtual character) disassembles the model (virtual character) in the game scene, if the model in the scene is hit with a weapon, the id of the hit model is uploaded to the server.

At step S330, the state of the attacked model is updated.

The server will calculate the damage caused to the model according to the weapon used by the game character, and acquire the material of the model and the blood volume configured for the model from a data table generated for the server. When the damage to the model reaches a certain blood volume, the corresponding material will be dropped. The server will synchronize the current blood volume state of the model to the clients corresponding to all game characters in the region. When the blood volume of the model is 0, the server will synchronize removing information of the model, that is, regional virtual resource state information, to the clients corresponding to all game characters in the region. When the model is removed, the server will also remove the model from a construction grid (geometry in the game scene), which updates the information about the construction grid. In addition, the server will also remove the model from an adjacent relationship of adjacent models of the model. When removing, the server will also determine whether the models adjacent to the model can be connected to the ground. If not, the associated models that cannot be connected to the ground will be deleted.

During the interaction with the client, the server buffers the state-changed models, and also modifies the version number of the corresponding region.

At step S340, the state of the attacked model is buffered, rendered and displayed.

After receiving the state synchronization information (regional virtual resource state information) of the attacked model, the client first buffers the state synchronization information, and then performs special effect performance in the client, including smoke, sparks, vibration, cracks, life bars, etc. Meanwhile, the model is also deleted from the virtual resource state index table of the client, so that when the client constructs the virtual resource in the game scene, it can be determined whether the virtual resource can be constructed at the same position of the removed virtual resource or whether the virtual resource can be constructed at an adjacent region of the model.

Through the above implementation manner, according to a current position of a virtual character in a game scene, a region where the virtual character is located is determined, corresponding virtual resources are loaded in the game scene according to the range of the region, and the states of the virtual resources in the game scene are updated in a unit of region, which effectively reduces resource consumption and can greatly reduce the pressure of data processing.

Figure 6:
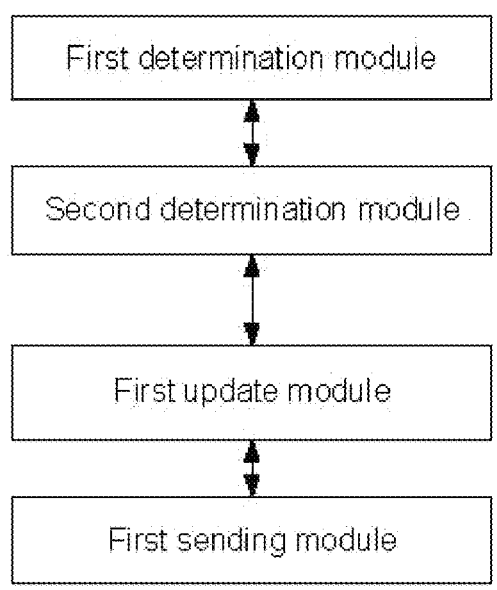
FIG. 6 is a composition diagram of a processing apparatus for a virtual resource in a game scene according to an embodiment of the present disclosure.

A processing apparatus for a virtual resource in a game scene is also disclosed in the present exemplary embodiment. FIG. 6 is a composition diagram of a processing apparatus for a virtual resource in a game scene according to an embodiment of the present disclosure. As shown in FIG. 6, the apparatus includes a first determination module, a second determination module, a first update module, and a first sending module.

The first determination module is configured to determine, according to a current position of a virtual character in a game scene, a region where the virtual character is located.

The second determination module is configured to receive an identifier of a virtual resource to be removed, and determine the virtual resource to be removed according to the identifier of the virtual resource to be removed.

The first update module is configured to delete the virtual resource to be removed from the region in the game scene, and generate regional virtual resource state information corresponding to the region.

The first sending module is configured to send the regional virtual resource state information to a client corresponding to the virtual character, so that the client renders and displays the virtual resources corresponding to the regional virtual resource state information according to the regional virtual resource state information.

Through the above implementation manner, according to a current position of a virtual character in a game scene, a region where the virtual character is located is determined, corresponding virtual resources are loaded in the game scene according to the range of the region, and the states of the virtual resources in the game scene are updated in a unit of region, which effectively reduces resource consumption and can greatly reduce the pressure of data processing.

Specific details of various module units in the above embodiment have been described in detail in the corresponding processing method for a virtual resource in a game scene. In addition, it can be understood that the processing apparatus for a virtual resource in a game scene further includes other unit modules corresponding to those in the information processing method. Therefore, detail descriptions are omitted herein.

Figure 7:
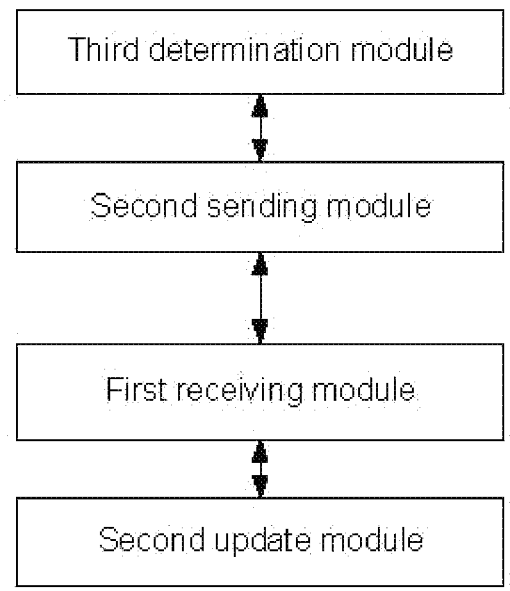
FIG. 7 is a composition diagram of a processing apparatus for a virtual resource in a game scene according to an embodiment of the present disclosure.

A processing apparatus for a virtual resource in a game scene is also disclosed in the present exemplary embodiment. FIG. 7 is a composition diagram of a processing apparatus for a virtual resource in a game scene according to an embodiment of the present disclosure. As shown in FIG. 7, the apparatus includes a third determination module, a second sending module, a first receiving module, and a second update module.

The third determination module is configured to determine, in response to a removing event of the virtual resource in the game scene, a virtual resource as a virtual resource to be removed from multiple virtual resources in the game scene.

The second sending module is configured to send an identifier of the virtual resource to be removed to a server.

The first receiving module is configured to receive regional virtual resource state information returned from the server, wherein the regional virtual resource state information being virtual resource state information in a region where the virtual character is located, which is determined by the server according to a current position of the virtual character.

The second update module is configured to update the states of the virtual resources in the region according to the regional virtual resource state information, and render and display the virtual resources corresponding to the regional virtual resource state information according to the updated states of the virtual resources.

Through the above implementation manner, according to a current position of a virtual character in a game scene, a region where the virtual character is located is determined, corresponding virtual resources are loaded in the game scene according to the range of the region, and the states of the virtual resources in the game scene are updated in a unit of region, which effectively reduces resource consumption and can greatly reduce the pressure of data processing.

Specific details of various module units in the above embodiment have been described in detail in the corresponding processing method for a virtual resource in a game scene. In addition, it can be understood that the processing apparatus for a virtual resource in a game scene further includes other unit modules corresponding to those in the information processing method. Therefore, detail descriptions are omitted herein.

It should be noted that although several modules or units of the device for action execution are mentioned in the above detailed description, such division is not mandatory. In fact, according to the implementation manners of the disclosure, the features and functions of two or more modules or units described above may be embodied in one module or unit. Conversely, the features and functions of one module or unit described above may be further divided into multiple modules or units to be embodied.

Figure 8:
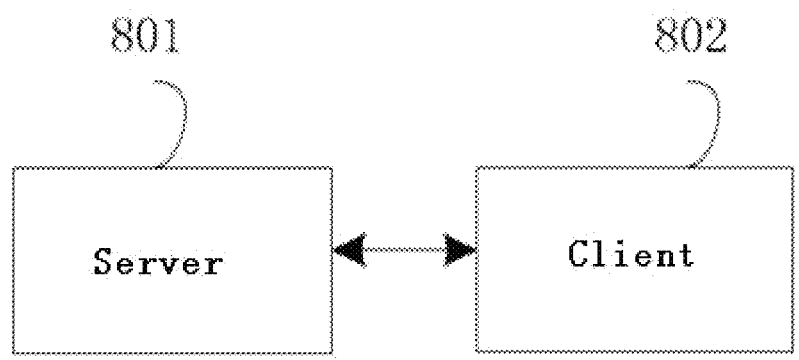
FIG. 8 is a composition diagram of a game system according to an embodiment of the present disclosure.

A game system is also disclosed in the present exemplary embodiment. FIG. 8 is a composition diagram of a game system according to an embodiment of the present disclosure. As shown in FIG. 8, the game system includes a server 801 and a client 802.

The server includes: a first processor and a first memory.

The first memory is configured to store a first executable instruction of the first processor.

The first processor is configured to execute the above processing method for a virtual resource in a game scene by executing the first executable instruction.

The client may include: a second processor and a second memory.

The second memory is configured to store a second executable instruction of the second processor.

The second processor is configured to execute the above processing method for a virtual resource in a game scene by executing the second executable instruction.

Through the above implementation manner, according to a current position of a virtual character in a game scene, a region where the virtual character is located is determined, corresponding virtual resources are loaded in the game scene according to the range of the region, and the states of the virtual resources in the game scene are updated in a unit of region, which effectively reduces resource consumption and can greatly reduce the pressure of data processing.

It should be noted that the embodiment of the present disclosure only describes a game system having a server and a client as an example. However, in a specific implementation, the game system may have one or more clients, and the number of each client may be configured according to the actual application.

Figure 9:
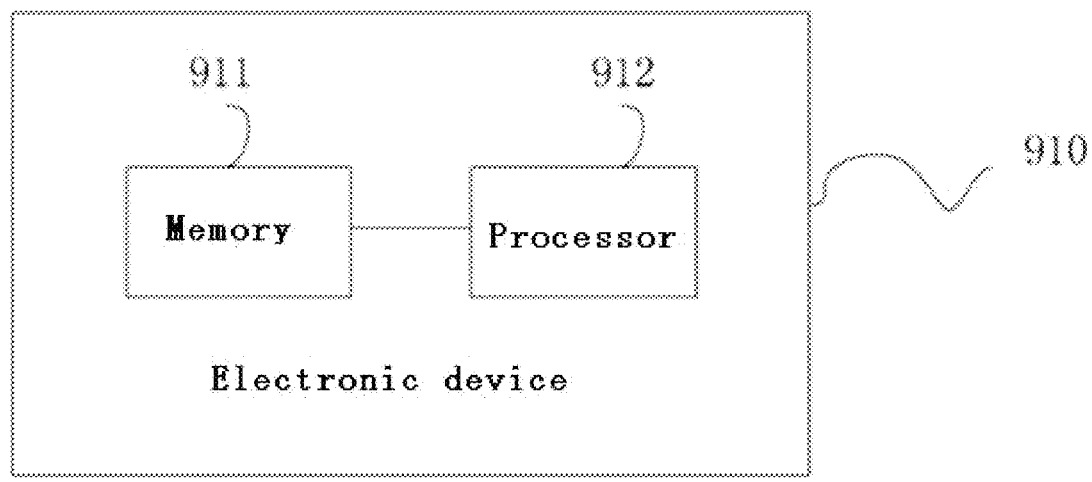
FIG. 9 is a structural schematic diagram of an electronic device according to one embodiment of the disclosure.

FIG. 9 is a structure schematic diagram of an electronic device according to one embodiment of the present disclosure. As shown in FIG. 9, the electronic device 910 of the present embodiment includes: a memory 911 and a processor 912. The memory 911 and the processor 912 may be connected by a bus.

The processor 912 is provided.

The memory 911 is configured to store an executable instruction of the processor.

The processor is configured to perform the following steps by executing the executable instruction.

According to a current position of a virtual character in a game scene, a region where the virtual character is located is determined.

An identifier of a virtual resource to be removed is received, and the virtual resource to be removed is determined according to the identifier of the virtual resource to be removed.

The virtual resource to be removed is removed from the region in the game scene, and regional virtual resource state information corresponding to the region is generated.

The regional virtual resource state information is sent to a client corresponding to the virtual character, so that the client renders and displays the virtual resources corresponding to the regional virtual resource state information according to the regional virtual resource state information.

Optionally, before the virtual resource to be removed is removed from the region in the game scene, the method further includes the following step.

It is detected that the virtual resource to be removed meets a preset condition.

Optionally, before regional virtual resource state information corresponding to the region is generated, the method further includes the following steps.

Adjacent virtual resources that have an adjacent relationship with the virtual resource to be removed are determined.

An adjacent relationship table of the adjacent virtual resources is acquired, and the virtual resource to be removed is removed from the adjacent relationship table.

According to the adjacent relationship table, it is determined whether the adjacent virtual resources are connected to the ground. If the adjacent virtual resources cannot be connected to the ground, the adjacent virtual resources are deleted from the region in the game scene.

Optionally, the game scene is divided into multiple regions, and each of the regions is respectively provided with a regional version number, where the regional version number is used to identify current state information of the virtual resources in the region. After a region where the virtual character is located is determined according to a current position of a virtual character in a game scene, the method further includes the following steps.

It is determined whether the virtual character enters the region for the first time.

In response to that the virtual character enters the region for the first time, the current regional version number of the region is saved as the virtual character regional version information, and the regional virtual resource state information corresponding to the current regional version number of the region is sent to the client corresponding to the virtual character.

In response to that the virtual character does not enter the region for the first time, the virtual character regional version information corresponding to the virtual character is acquired.

The virtual character regional version information is matched with the current regional version number of the region.

In response to that the virtual character regional version information is different from the current regional version number of the region, the regional virtual resource state information corresponding to the current regional version number of the region is sent to the client corresponding to the virtual character.

Optionally, the virtual resource to be removed is removed from the region in the game scene, and regional virtual resource state information corresponding to the region is generated. The method further includes the following steps.

The virtual resource to be removed is removed from the region in the game scene.

A regional version number corresponding to the region is iterated and determined as a current regional version number of the region.

Regional virtual resource state information is updated, according to the current regional version number of the region.

Optionally, the method further includes the following steps.

A virtual resource state index table is established for the multiple virtual resources in the game scene, where the virtual resource state index table includes at least: a virtual resource identifier corresponding to each virtual resource and virtual resource state information of each virtual resource.

The virtual resource state index table is synchronized to the client.

Optionally, the game scene includes composite models composed of at least two virtual resources, where high-bit information in the virtual resource identifier is used to identify the composite model, and low-bit information in the identifier is used to identify the virtual resources constituting the composite model.

Optionally, the virtual resource state index table further includes: virtual resource shape information corresponding to each virtual resource, where the virtual resource shape information is one of the following: a horizontal plane, a vertical plane, an upward slope, and a downward slope.

Optionally, the virtual resource state index table further includes: virtual resource classification information corresponding to each virtual resource, where the virtual resource classification information is one of the following: an existing virtual resource and a newly created virtual resource.

Optionally, the space of the game scene is divided into multiple geometries spliced with each other, the virtual resource is built on a surface of one geometry or an inner section of one geometry, and the region in the game scene is composed of at least one geometry. The virtual resource state index table further includes: geometry index information corresponding to each virtual resource, where the geometry index information is used to identify a mapping relationship between the geometry and the virtual resource.

Optionally, the virtual resource state index table further includes: regional index information corresponding to each virtual resource, where the regional index information is used to identify a mapping relationship between the region and the virtual resource.

Optionally, the operation that the virtual resource to be removed is removed from the region in the game scene and regional virtual resource state information corresponding to the region is generated includes the following operations.

Virtual resource state information in the region is acquired from the virtual resource state index table, according to the region where virtual character is located The virtual resource to be removed is removed from the region in the game scene, the virtual resource state information in the region is updated, and regional virtual resource state information corresponding to the region is generated.

Through the above implementation manner, according to a current position of a virtual character in a game scene, a region where the virtual character is located is determined, corresponding virtual resources are loaded in the game scene according to the range of the region, and the states of the virtual resources in the game scene are updated in a unit of region, which effectively reduces resource consumption and can greatly reduce the pressure of data processing.

Figure 10:
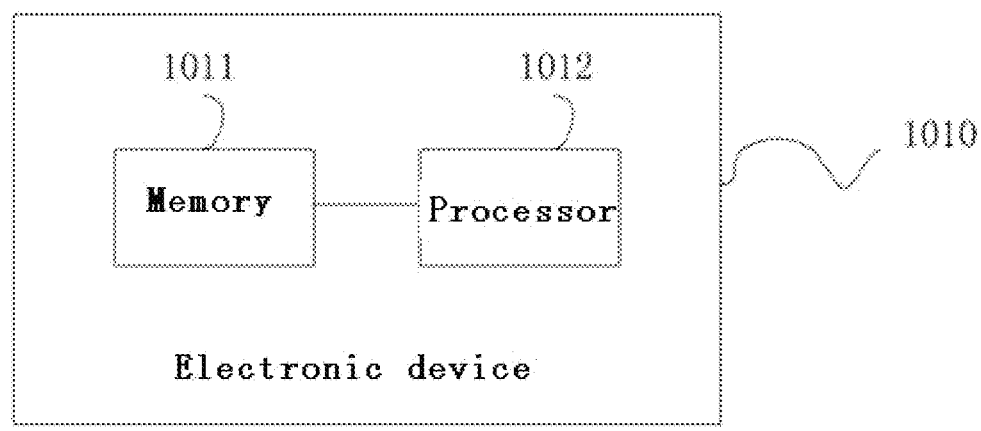
FIG. 10 is a structural schematic diagram of an electronic device according to one embodiment of the disclosure.

FIG. 10 is a structure schematic diagram of an electronic device according to one embodiment of the present disclosure. As shown in FIG. 10, the electronic device 1010 of the present embodiment includes: a memory 1011 and a processor 1012. The memory 1011 and the processor 1012 may be connected by a bus.

The processor 1012 is provided.

The memory 1011 is configured to store an executable instruction of the processor.

The processor is configured to perform the following steps by executing the executable instruction.

In response to a removing event of the virtual resource in the game scene, a virtual resource is determined as a virtual resource to be removed from multiple virtual resources in the game scene.

An identifier of the virtual resource to be removed is sent to a server.

Regional virtual resource state information returned from the server is received, the regional virtual resource state information being virtual resource state information in a region where the virtual character is located, which is determined by the server according to a current position of the virtual character.

The states of the virtual resources in the region are updated according to the regional virtual resource state information, and the virtual resources corresponding to the regional virtual resource state information are rendered and displayed according to the updated states of the virtual resources.

Optionally, the states of the virtual resources in the region are updated according to the regional virtual resource state information, and the virtual resources corresponding to the regional virtual resource state information are rendered and displayed according to the updated states of the virtual resources. The method further includes the following steps.

The state of a virtual resource to be removed in the region and the state of an adjacent virtual resource of the virtual resource to be removed are updated according to the regional virtual resource state information, and the virtual resources in the region are rendered and displayed according to the updated states of the virtual resources in the region.

Optionally, before responding to a removing event of the virtual resource in the game scene, the method further includes the following steps.

A current position of the virtual character in the game scene is acquired, and a virtual resource state index table is acquired locally.

The virtual resources in the game scene are rendered and loaded according to the current position of the virtual character in the game scene and the virtual resource state index table.

Optionally, the operation that the virtual resources in the game scene are rendered and loaded according to the current position of the virtual character in the game scene and the virtual resource state index table includes the following operations.

According to a current position of a virtual character in a game scene, a region where the virtual character is located is determined.

Virtual resource state information in the region is acquired according to the virtual resource state index table.

The virtual resources in the region of the game scene are rendered and loaded according to the virtual resource state information in the region.

Optionally, the states of the virtual resources in the region are updated according to the regional virtual resource state information, and the virtual resources corresponding to the regional virtual resource state information are rendered and displayed according to the updated states of the virtual resources. The method further includes the following steps.

The local virtual resource state index table is updated according to the regional virtual resource state information.

The virtual resources are rendered and displayed according to the updated virtual resource state index table.

Optionally, the virtual resource state index table further includes: virtual resource identifier corresponding to each virtual resource and virtual resource state information of each virtual resource.

Optionally, the game scene includes composite models composed of at least two virtual resources, where high-bit information in the virtual resource identifier is used to identify the composite model, and low-bit information in the identifier is used to identify the virtual resources constituting the composite model.

Optionally, the virtual resource state index table further includes: virtual resource shape information corresponding to each virtual resource, where the virtual resource shape information is one of the following: a horizontal plane, a vertical plane, an upward slope, and a downward slope.

Optionally, the virtual resource state index table further includes: virtual resource classification information corresponding to each virtual resource, where the virtual resource classification information is one of the following: an existing virtual resource and a newly created virtual resource.

Optionally, the space of the game scene is divided into multiple geometries spliced with each other, the virtual resource is built on a surface of one geometry or an inner section of one geometry, and the region in the game scene is composed of at least one geometry. The virtual resource state index table further includes: geometry index information corresponding to each virtual resource, where the geometry index information is used to identify a mapping relationship between the geometry and the virtual resource.

Optionally, the virtual resource state index table further includes: regional index information corresponding to each virtual resource, where the regional index information is used to identify a mapping relationship between the region and the virtual resource.

Through the above implementation manner, according to a current position of a virtual character in a game scene, a region where the virtual character is located is determined, corresponding virtual resources are loaded in the game scene according to the range of the region, and the states of the virtual resources in the game scene are updated in a unit of region, which effectively reduces resource consumption and can greatly reduce the pressure of data processing.

In an alternative implementation manner, the electronic device may further include one or more processors, and memory resources represented by the memory for storing an instruction executable by the processing component, such as an application program. The application program stored in the memory may include one or more modules each corresponding to a set of instructions. In addition, the processing component is configured to execute instructions to perform the information processing method described above.

The electronic device may also include: a power supply component, configured to perform power management on the executing electronic device; a wired or wireless network interface, configured to connect the electronic device to a network; and an input/output (I/O) interface. The electronic device may operate based on an operating system stored in the memory, such as Android, iOS, Windows, Mac OS X, Unix, Linux, FreeBSD, or the like.

Figure 11:
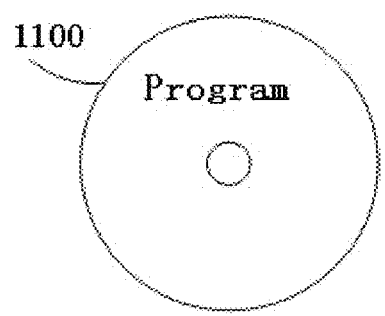
FIG. 11 is a structural schematic diagram of a storage medium according to an embodiment of the present disclosure.

FIG. 11 is a structure schematic diagram of a storage medium according to an embodiment of the present disclosure. As shown in FIG. 11, a program product 1100 according to an implementation manner of the present disclosure is described. A computer program is stored thereon. When being executed by a processor, the computer program implements the following steps:

According to a current position of a virtual character in a game scene, a region where the virtual character is located is determined.

An identifier of a virtual resource to be removed is received, and the virtual resource to be removed is determined according to the identifier of the virtual resource to be removed.

The virtual resource to be removed is removed from the region in the game scene, and regional virtual resource state information corresponding to the region is generated.

The regional virtual resource state information is sent to a client corresponding to the virtual character, so that the client renders and displays the virtual resources corresponding to the regional virtual resource state information according to the regional virtual resource state information.

Optionally, before the virtual resource to be removed is removed from the region in the game scene, the method further includes the following step.

It is detected that the virtual resource to be removed meets a preset condition. Optionally, before regional virtual resource state information corresponding to the region is generated, the method further includes the following steps.

Adjacent virtual resources that have an adjacent relationship with the virtual resource to be removed are determined.

An adjacent relationship table of the adjacent virtual resources is acquired, and the virtual resource to be removed is removed from the adjacent relationship table.

According to the adjacent relationship table, it is determined whether the adjacent virtual resources are connected to the ground. If the adjacent virtual resources cannot be connected to the ground, the adjacent virtual resources are deleted from the region in the game scene.

Optionally, the game scene is divided into multiple regions, and each of the regions is respectively provided with a regional version number, where the regional version number is used to identify current state information of the virtual resources in the region. After a region where the virtual character is located is determined according to a current position of a virtual character in a game scene, the method further includes the following steps.

It is determined whether the virtual character enters the region for the first time.

In response to that the virtual character enters the region for the first time, the current regional version number of the region is saved as the virtual character regional version information, and the regional virtual resource state information corresponding to the current regional version number of the region is sent to the client corresponding to the virtual character.

In response to that the virtual character does not enter the region for the first time, the virtual character regional version information corresponding to the virtual character is acquired.

The virtual character regional version information is matched with the current regional version number of the region.

In response to that the virtual character regional version information is different from the current regional version number of the region, the regional virtual resource state information corresponding to the current regional version number of the region is sent to the client corresponding to the virtual character.

Optionally, the virtual resource to be removed is removed from the region in the game scene, and regional virtual resource state information corresponding to the region is generated. The method further includes the following steps.

The virtual resource to be removed is removed from the region in the game scene.

A regional version number corresponding to the region is iterated and determined as a current regional version number of the region.

Regional virtual resource state information is updated, according to the current regional version number of the region.

Optionally, the method further includes the following steps.

A virtual resource state index table is established for the multiple virtual resources in the game scene, where the virtual resource state index table includes at least: a virtual resource identifier corresponding to each virtual resource and virtual resource state information of each virtual resource.

The virtual resource state index table is synchronized to the client.

Optionally, the game scene includes composite models composed of at least two virtual resources, where high-bit information in the virtual resource identifier is used to identify the composite model, and low-bit information in the identifier is used to identify the virtual resources constituting the composite model.

Optionally, the virtual resource state index table further includes: virtual resource shape information corresponding to each virtual resource, where the virtual resource shape information is one of the following: a horizontal plane, a vertical plane, an upward slope, and a downward slope.

Optionally, the virtual resource state index table further includes: virtual resource classification information corresponding to each virtual resource, where the virtual resource classification information is one of the following: an existing virtual resource and a newly created virtual resource.

Optionally, the space of the game scene is divided into multiple geometries spliced with each other, the virtual resource is built on a surface of one geometry or an inner section of one geometry, and the region in the game scene is composed of at least one geometry. The virtual resource state index table further includes: geometry index information corresponding to each virtual resource, where the geometry index information is used to identify a mapping relationship between the geometry and the virtual resource.

Optionally, the virtual resource state index table further includes: regional index information corresponding to each virtual resource, where the regional index information is used to identify a mapping relationship between the region and the virtual resource.

Optionally, the operation that the virtual resource to be removed is removed from the region in the game scene and regional virtual resource state information corresponding to the region is generated includes the following operations.

Virtual resource state information in the region is acquired from the virtual resource state index table, according to the region where virtual character is located.

The virtual resource to be removed is removed from the region in the game scene, the virtual resource state information in the region is updated, and regional virtual resource state information corresponding to the region is generated.

Through the above implementation manner, according to a current position of a virtual character in a game scene, a region where the virtual character is located is determined, corresponding virtual resources are loaded in the game scene according to the range of the region, and the states of the virtual resources in the game scene are updated in a unit of region, which effectively reduces resource consumption and can greatly reduce the pressure of data processing.

The computer-readable storage medium may include a data signal that is propagated in a baseband or as part of a carrier wave, carrying readable program code. Such propagated data signals may take a variety of forms including, but not limited to, electromagnetic signals, optical signals, or any suitable combination of the foregoing. The computer-readable storage medium may send, propagate, or transmit a program for use by or in connection with an instruction execution system, device or apparatus.

Program codes included in the computer-readable storage medium may be transmitted by any suitable medium, including but not limited to wireless, wire, optical cable, radio frequency, etc., or any suitable combination of the foregoing.

Figure 12:
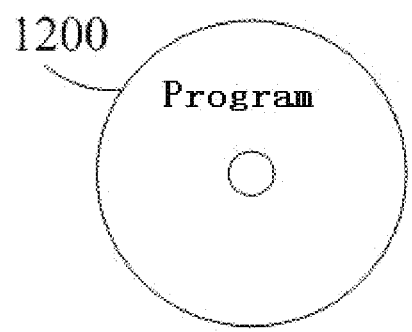
FIG. 12 is a structure schematic diagram of a storage medium according to an embodiment of the present disclosure.

FIG. 12 is a structure schematic diagram of a storage medium according to an embodiment of the present disclosure. As shown in FIG. 12, a program product 1200 according to an implementation manner of the present disclosure is described. A computer program is stored thereon. When being executed by a processor, the computer program implements the following steps.

In response to a removing event of the virtual resource in the game scene, a virtual resource is determined as a virtual resource to be removed from multiple virtual resources in the game scene.

An identifier of the virtual resource to be removed is sent to a server.

Regional virtual resource state information returned from the server is received, the regional virtual resource state information being virtual resource state information in a region where the virtual character is located, which is determined by the server according to a current position of the virtual character.

The states of the virtual resource in the region are updated according to the regional virtual resource state information, and the virtual resources corresponding to the regional virtual resource state information are rendered and displayed according to the updated states of the virtual resources.

Optionally, the states of the virtual resources in the region are updated according to the regional virtual resource state information, and the virtual resources corresponding to the regional virtual resource state information are rendered and displayed according to the updated states of the virtual resources. The method further includes the following steps.

The state of a virtual resource to be removed in the region and the state of an adjacent virtual resource of the virtual resource to be removed are updated according to the regional virtual resource state information, and the virtual resources in the region are rendered and displayed according to the updated states of the virtual resources in the region.

Optionally, before responding to a removing event of the virtual resource in the game scene, the method further includes the following steps.

A current position of the virtual character in the game scene is acquired, and a virtual resource state index table is acquired locally.

The virtual resources in the game scene are rendered and loaded according to the current position of the virtual character in the game scene and the virtual resource state index table.

Optionally, the operation that the virtual resources in the game scene are rendered and loaded according to the current position of the virtual character in the game scene and the virtual resource state index table includes the following operations.

According to a current position of a virtual character in a game scene, a region where the virtual character is located is determined.

Virtual resource state information in the region is acquired according to the virtual resource state index table.

The virtual resources in the region of the game scene are rendered and loaded according to the virtual resource state information in the region.

Optionally, the states of the virtual resource in the region are updated according to the regional virtual resource state information, and the virtual resources corresponding to the regional virtual resource state information are rendered and displayed according to the updated states of the virtual resources. The method further includes the following steps.

The local virtual resource state index table is updated according to the regional virtual resource state information.

The virtual resources are rendered and displayed according to the updated virtual resource state index table.

Optionally, the virtual resource state index table further includes: virtual resource identifier corresponding to each virtual resource and virtual resource state information of each virtual resource.

Optionally, the game scene includes composite models composed of at least two virtual resources, where high-bit information in the virtual resource identifier is used to identify the composite model, and low-bit information in the identifier is used to identify the virtual resources constituting the composite model.

Optionally, the virtual resource state index table further includes: virtual resource shape information corresponding to each virtual resource, where the virtual resource shape information is one of the following: a horizontal plane, a vertical plane, an upward slope, and a downward slope.

Optionally, the virtual resource state index table further includes: virtual resource classification information corresponding to each virtual resource, where the virtual resource classification information is one of the following: an existing virtual resource and a newly created virtual resource.

Optionally, the space of the game scene is divided into multiple geometries spliced with each other, the virtual resource is built on a surface of one geometry or an inner section of one geometry, and the region in the game scene is composed of at least one geometry. The virtual resource state index table further includes: geometry index information corresponding to each virtual resource, where the geometry index information is used to identify a mapping relationship between the geometry and the virtual resource.

Optionally, the virtual resource state index table further includes: regional index information corresponding to each virtual resource, where the regional index information is used to identify a mapping relationship between the region and the virtual resource.

Through the above implementation manner, according to a current position of a virtual character in a game scene, a region where the virtual character is located is determined, corresponding virtual resources are loaded in the game scene according to the range of the region, and the states of the virtual resources in the game scene are updated in a unit of region, which effectively reduces resource consumption and can greatly reduce the pressure of data processing.

The computer-readable storage medium may include a data signal that is propagated in a baseband or as part of a carrier wave, carrying readable program code. Such propagated data signals may take a variety of forms including, but not limited to, electromagnetic signals, optical signals, or any suitable combination of the foregoing. The computer-readable storage medium may send, propagate, or transmit a program for use by or in connection with an instruction execution system, device or apparatus.

Program codes included in the computer-readable storage medium may be transmitted by any suitable medium, including but not limited to wireless, wire, optical cable, radio frequency, etc., or any suitable combination of the foregoing.

Through the description of the above implementation manner, those skilled in the art will easily understand that the example implementation manners described herein may be implemented by software or by software in combination with necessary hardware. Therefore, the technical solution according to the implementation manner of the present disclosure may be embodied in the form of a software product, which may be stored in a non-volatile storage medium or on a network, the non-volatile storage medium may be a CD-ROM, a USB flash drive, a mobile hard disk, etc. A number of instructions are included to cause a computing device to execute a method according to an implementation manner of the present disclosure, the computing device may be a personal computer, server, electronic device, or network device, etc.

Other embodiments of the present disclosure will be apparent to those skilled in the art after considering the specification and practicing the disclosure herein. The present application is intended to cover any variations, uses, or adaptations of the present disclosure, that conform to the general principles of the present disclosure and include common general knowledge or conventional technical means in the art that are not disclosed in the present disclosure. The specification and examples are to be regarded as exemplary only, and the true scope and spirit of the present disclosure are pointed out by the claims.

It is to be understood that the present disclosure is not limited to the accurate structure that have been described and shown in the accompanying drawings, and various modifications and changes may be made without departing from the scope thereof. The scope of the present disclosure is limited only by the appended claims.

What is claimed is:

1. A processing method for a virtual resource in a game scene, comprising:
    determining a region where a virtual character is located according to a current position of a virtual character in the game scene;
    receiving an identifier of a virtual resource to be removed, and determining the virtual resource to be removed according to the identifier of the virtual resource to be removed;
    removing the virtual resource to be removed from the region in the game scene, and generating regional virtual resource state information corresponding to the region; and
    sending the regional virtual resource state information to a client corresponding to the virtual character, so that the client renders and displays the virtual resource corresponding to the regional virtual resource state information according to the regional virtual resource state information;
    further comprising:
    establishing a virtual resource state index table according to the plurality of virtual resources in the game scene, the virtual resource state index table at least comprising: a virtual resource identifier corresponding to each virtual resource and virtual resource state information of each virtual resource; and
    synchronizing the virtual resource state index table to the client;
    wherein the virtual resource state index table further comprises: virtual resource shape information corresponding to each virtual resource, wherein the virtual resource shape information is one of the following: a horizontal plane, a vertical plane, an upward slope, and a downward slope.

2. The method as claimed in claim 1, wherein before the virtual resource to be removed is removed from the region in the game scene, the method further comprises:
    in response to that the virtual resource to be removed meets a preset condition.

3. The method as claimed in claim 1, wherein before regional virtual resource state information corresponding to the region is generated, the method further comprises:
    determining adjacent virtual resources that have an adjacent relationship with the virtual resource to be removed;
    acquiring an adjacent relationship table of the adjacent virtual resources, and removing the virtual resource to be removed from the adjacent relationship table; and
    determining, according to the adjacent relationship table, whether the adjacent virtual resources are connected to the ground, and when the adjacent virtual resources cannot be connected to the ground, removing the adjacent virtual resources from the region in the game scene.

4. The method as claimed in claim 1, wherein the game scene is divided into a plurality of regions, each of the regions is respectively provided with a regional version number, the regional version number is used to identify current state information of the virtual resources in the region, and after the region where the virtual character is located is determined according to the current position of the virtual character in the game scene, the method further comprises:
    determining whether the virtual character enters the region for the first time;
    in response to that the virtual character enters the region for the first time, saving a current regional version number of the region as the virtual character regional version information, and sending the regional virtual resource state information corresponding to the current regional version number of the region to the client corresponding to the virtual character;

in response to that the virtual character does not enter the region for the first time, acquiring the virtual character regional version information corresponding to the virtual character;

matching the virtual character regional version information with the current regional version number of the region; and in response to that the virtual character regional version information is different from the current regional version number of the region, sending the regional virtual resource state information corresponding to the current regional version number of the region to the client corresponding to the virtual character.

5. The method as claimed in claim 4, wherein removing the virtual resource to be removed from the region in the game scene, and generating regional virtual resource state information corresponding to the region comprises:

removing the virtual resource to be removed from the region in the game scene;

iterating a regional version number corresponding to the region to determine the current regional version number of the region; and updating regional virtual resource state information, according to the current regional version number of the region.

6. The method as claimed in claim 1, wherein the game scene comprises a composite model composed of at least two virtual resources, high-bit information in the virtual resource identifier is used to identify the composite model, and low-bit information in the identifier is used to identify the virtual resources constituting the composite model.

7. The method as claimed in claim 1, wherein the virtual resource state index table further comprises: virtual resource classification information corresponding to each virtual resource, wherein the virtual resource classification information is one of the following: an existing virtual resource and a new virtual resource.

8. The method as claimed in claim 1, wherein the space of the game scene is divided into a plurality of geometries spliced with each other, the virtual resource is built on a surface of one geometry or an inner section of one geometry, the region in the game scene is composed of at least one geometry, and the virtual resource state index table further comprises: geometry index information corresponding to each virtual resource, and the geometry index information is used to identify a mapping relationship between the geometry and the virtual resource.

9. The method as claimed in claim 1, wherein the virtual resource state index table further comprises: regional index information corresponding to each virtual resource, and the regional index information is used to identify a mapping relationship between the region and the virtual resource.

10. The method as claimed in claim 9, wherein removing the virtual resource to be removed from the region in the game scene and generating regional virtual resource state information corresponding to the region comprises:

acquiring the virtual resource state information in the region from the virtual resource state index table, according to the region where virtual character is located; and removing the virtual resource to be removed from the region in the game scene, and updating the virtual resource state information in the region to generate regional virtual resource state information corresponding to the region.

11. A processing method for a virtual resource in a game scene, comprising:

in response to a removing event of the virtual resource in the game scene, determining a virtual resource as a virtual resource to be removed from a plurality of virtual resources in the game scene;

sending an identifier of the virtual resource to be removed to a server;

receiving regional virtual resource state information returned from the server, wherein the regional virtual resource state information being virtual resource state information in a region where the virtual character is located, which is determined by the server according to a current position of the virtual character; and updating the state of the virtual resource in the region according to the regional virtual resource state information, and rendering and displaying the virtual resource corresponding to the regional virtual resource state information according to the updated state of the virtual resource;

receiving a virtual resource state index table, wherein the virtual resource state index table established in the server according to the plurality of virtual resources in the game scene, the virtual resource state index table at least comprising: a virtual resource identifier corresponding to each virtual resource and virtual resource state information of each virtual resource;

wherein the virtual resource state index table further comprises: virtual resource shape information corresponding to each virtual resource, and the virtual resource shape information is one of the following: a horizontal plane, a vertical plane, an upward slope, and a downward slope.

12. The method as claimed in claim 11, wherein updating the state of the virtual resource in the region according to the regional virtual resource state information, and rendering and displaying the virtual resource corresponding to the regional virtual resource state information according to the updated state of the virtual resource comprises:

updating the state of the virtual resource to be removed in the region and a state of an adjacent virtual resource of the virtual resource to be removed according to the regional virtual resource state information, and rendering and displaying the virtual resource in the region according to the updated state of the virtual resource in the region.

13. The method as claimed in claim 11, wherein before responding to a removing event of the virtual resource in the game scene, the method further comprises:

acquiring a current position of the virtual character in the game scene, and acquiring a virtual resource state index table locally; and loading and rendering the virtual resources in the game scene according to the current position of the virtual character in the game scene and the virtual resource state index table.

14. The method as claimed in claim 13, wherein loading and rendering the virtual resources in the game scene according to the current position of the virtual character in the game scene and the virtual resource state index table comprises:

determining a region where the virtual character is located according to a current position of the virtual character in the game scene;

acquiring virtual resource state information in the region according to the virtual resource state index table; and loading and rendering the virtual resource in the region of the game scene according to the virtual resource state information in the region.

15. The method as claimed in claim 14, wherein updating the state of the virtual resource in the region according to the regional virtual resource state information, and rendering and displaying the virtual resource corresponding to the regional virtual resource state information according to the updated state of the virtual resource comprises:

updating the local virtual resource state index table according to the regional virtual resource state information; and rendering and displaying the virtual resource according to the updated virtual resource state index table.

16. The method as claimed in claim 13, wherein the virtual resource state index table further comprises: virtual resource identifier corresponding to each virtual resource and virtual resource state information of each virtual resource.

17. The method as claimed in claim 16, wherein the game scene comprises a composite model composed of at least two virtual resources, high-bit information in the virtual resource identifier is used to identify the composite model, and low-bit information in the identifier is used to identify the virtual resources constituting the composite model.

18. The method as claimed in claim 13, wherein the virtual resource state index table further comprises: virtual resource classification information corresponding to each virtual resource, and the virtual resource classification information is one of the following: an existing virtual resource and a new virtual resource.

19. The method as claimed in claim 13, wherein the space of the game scene is divided into a plurality of geometries spliced with each other, the virtual resource is built on a surface of the geometry or an inner section of the geometry, the region in the game scene is composed of at least one geometry, and the virtual resource state index table further comprises: geometry index information corresponding to each virtual resource, and the geometry index information is used to identify a mapping relationship between the geometry and the virtual resource.

20. The method as claimed in claim 13, wherein the virtual resource state index table further comprises: regional index information corresponding to each virtual resource, and the regional index information is used to identify a mapping relationship between the region and the virtual resource.

21. A game system, comprising: a server and a client, wherein the server comprises: a first processor; and a first memory, configured to store a first executable instruction of the first processor, wherein the first processor is configured to execute the processing method of a virtual resource in a game scene by executing the first executable instruction, wherein the first executable instruction comprise:

determining a region where a virtual character is located according to a current position of a virtual character in the game scene;

receiving an identifier of a virtual resource to be removed, and determining the virtual resource to be removed according to the identifier of the virtual resource to be removed;

removing the virtual resource to be removed from the region in the game scene, and generating regional virtual resource state information corresponding to the region; and sending the regional virtual resource state information to a client corresponding to the virtual character, so that the client renders and displays the virtual resource corresponding to the regional virtual resource state information according to the regional virtual resource state information;

further comprising:

establishing a virtual resource state index table according to the plurality of virtual resources in the game scene, the virtual resource state index table at least comprising: a virtual resource identifier corresponding to each virtual resource and virtual resource state information of each virtual resource; and synchronizing the virtual resource state index table to the client;

wherein the virtual resource state index table further comprises: virtual resource shape information corresponding to each virtual resource, wherein the virtual resource shape information is one of the following: a horizontal plane, a vertical plane, an upward slope, and a downward slope;

the first processor is configured to perform the following processing steps via execution of the first executable instructions:

the client comprises: a second processor; and a second memory, configured to store a second executable instruction of the second processor, wherein the second processor is configured to execute the processing method of a virtual resource in a game scene by executing the second executable instruction, wherein the second executable instruction comprise:

in response to a removing event of the virtual resource in the game scene, determining a virtual resource as a virtual resource to be removed from a plurality of virtual resources in the game scene;

sending an identifier of the virtual resource to be removed to a server;

receiving regional virtual resource state information returned from the server, wherein the regional virtual resource state information being virtual resource state information in a region where the virtual character is located, which is determined by the server according to a current position of the virtual character; and updating the state of the virtual resource in the region according to the regional virtual resource state information, and rendering and displaying the virtual resource corresponding to the regional virtual resource state information according to the updated state of the virtual resource;

receiving a virtual resource state index table, wherein the virtual resource state index table established in the server according to the plurality of virtual resources in the game scene, the virtual resource state index table at least comprising: a virtual resource identifier corresponding to each virtual resource and virtual resource state information of each virtual resource;

wherein the virtual resource state index table further comprises: virtual resource shape information corresponding to each virtual resource, and the virtual resource shape information is one of the following: a horizontal plane, a vertical plane, an upward slope, and a downward slope.

22. An electronic device, comprising:
a processor; and
a memory, configured to store an executable instruction of the processor;
wherein the processor is configured to execute the processing method of a virtual resource in a game scene by executing the executable instruction, wherein the executable instruction comprise:
determining a region where a virtual character is located according to a current position of a virtual character in the game scene;
receiving an identifier of a virtual resource to be removed, and determining the virtual resource to be removed according to the identifier of the virtual resource to be removed:
removing the virtual resource to be removed from the region in the game scene, and generating regional virtual resource state information corresponding to the region; and
sending the regional virtual resource state information to a client corresponding to the virtual character, so that the client renders and displays the virtual resource corresponding to the regional virtual resource state information according to the regional virtual resource state information;
further comprising:
establishing a virtual resource state index table according to the plurality of virtual resources in the game scene, the virtual resource state index table at least comprising: a virtual resource identifier corresponding to each virtual resource and virtual resource state information of each virtual resource; and
synchronizing the virtual resource state index table to the client;
wherein the virtual resource state index table further comprises: virtual resource shape information corresponding to each virtual resource, wherein the virtual resource shape information is one of the following: a horizontal plane, a vertical plane, an upward slope, and a downward slope.

23. An electronic device, comprising:
a processor; and
a memory, configured to store an executable instruction of the processor,
wherein the processor is configured to execute the processing method of a virtual resource in a game scene by executing the executable instruction, wherein the executable instruction comprise:
in response to a removing event of the virtual resource in the game scene, determining a virtual resource as a virtual resource to be removed from a plurality of virtual resources in the game scene;
sending an identifier of the virtual resource to be removed to a server;
receiving regional virtual resource state information returned from the server, wherein the regional virtual resource state information being virtual resource state information in a region where the virtual character is located, which is determined by the server according to a current position of the virtual character; and
updating the state of the virtual resource in the region according to the regional virtual resource state information, and rendering and displaying the virtual resource corresponding to the regional virtual resource state information according to the updated state of the virtual resource;
receiving a virtual resource state index table, wherein the virtual resource state index table established in the server according to the plurality of virtual resources in the game scene, the virtual resource state index table at least comprising: a virtual resource identifier corresponding to each virtual resource and virtual resource state information of each virtual resource;
wherein the virtual resource state index table further comprises: virtual resource shape information corresponding to each virtual resource, and the virtual resource shape information is one of the following: a horizontal plane, a vertical plane, an upward slope, and a downward slope.

24. A non-transitory computer-readable storage medium, on which a computer program is stored, wherein the computer program is executed by a processor to implement the processing method of a virtual resource in a game scene, wherein the computer program comprise:
determining a region where a virtual character is located according to a current position of a virtual character in the game scene;
receiving an identifier of a virtual resource to be removed, and determining the virtual resource to be removed according to the identifier of the virtual resource to be removed:
removing the virtual resource to be removed from the region in the game scene, and generating regional virtual resource state information corresponding to the region; and
sending the regional virtual resource state information to a client corresponding to the virtual character, so that the client renders and displays the virtual resource corresponding to the regional virtual resource state information according to the regional virtual resource state information;
further comprising:
establishing a virtual resource state index table according to the plurality of virtual resources in the game scene, the virtual resource state index table at least comprising: a virtual resource identifier corresponding to each virtual resource and virtual resource state information of each virtual resource; and
synchronizing the virtual resource state index table to the client;
wherein the virtual resource state index table further comprises: virtual resource shape information corresponding to each virtual resource, wherein the virtual resource shape information is one of the following: a horizontal plane, a vertical plane, an upward slope, and a downward slope.

25. A non-transitory computer-readable storage medium, on which a computer program is stored, wherein the computer program is executed by a processor to implement the processing method of a virtual resource in a game scene, wherein the computer program comprise:
in response to a removing event of the virtual resource in the game scene, determining a virtual resource as a virtual resource to be removed from a plurality of virtual resources in the game scene;
sending an identifier of the virtual resource to be removed to a server;
receiving regional virtual resource state information returned from the server, wherein the regional virtual resource state information being virtual resource state information in a region where the virtual character is located, which is determined by the server according to a current position of the virtual character; and updating the state of the virtual resource in the region according to the regional virtual resource state information, and rendering and displaying the virtual resource corresponding to the regional virtual resource state information according to the updated state of the virtual resource;

receiving a virtual resource state index table, wherein the virtual resource state index table established in the server according to the plurality of virtual resources in the game scene, the virtual resource state index table at least comprising: a virtual resource, identifier corresponding to each virtual resource and virtual resource state information of each virtual resource;

wherein the virtual resource state index table further comprises: virtual resource shape information corresponding to each virtual resource, and the virtual resource shape information is one of the following: a horizontal plane, a vertical plane, an upward slope, and a downward slope.

\* \* \* \* \*